US012606435B2

(12) United States Patent (10) Patent No.: US 12,606,435 B2
Bleck et al. (45) Date of Patent: Apr. 21, 2026

(54) OXYGEN PRODUCTION SYSTEM AND METHOD

(71) Applicants:James Bleck, Chelmsford, MA (US);
Alexander Otto, Ayers, MA (US)

(72) Inventors: James Bleck, Chelmsford, MA (US);
Alexander Otto, Ayers, MA (US)

( * ) Notice: Subject to any disclaimer, the term of this
patent is extended or adjusted under 35
U.S.C. 154(b) by 0 days.

(21) Appl. No.: 19/338,254

(22) Filed: Sep. 24, 2025

(65) Prior Publication Data

US 2026/0084962 A1 Mar. 26, 2026

Related U.S. Application Data

(60) Provisional application No. 63/698,616, filed on Sep.
25, 2024.

(51) Int. Cl.
C01B 13/02 (2006.01)
B01J 8/06 (2006.01)

(52) U.S. Cl.
CPC ........... C01B 13/0214 (2013.01); B01J 8/065
(2013.01); *B01J 2208/00893* (2013.01); *B01J
2208/027* (2013.01)

(58) Field of Classification Search
None
See application file for complete search history.

(56) References Cited

U.S. PATENT DOCUMENTS 2,865,721 A 12/1958 Lane et al.
5,665,316 A * 9/1997 Salonia ............... C01B 13/0214
423/579

2008/0247926 A1 10/2008 Osterloh
2022/0267146 A1 8/2022 Hydrodine
2022/0347499 A1 11/2022 Avraham et al.

FOREIGN PATENT DOCUMENTS

KR 20050101589 A * 10/2005 ........... G09F 15/005

OTHER PUBLICATIONS

Machine Translation of Lee (KR20050101589A) (Year: 2005).*
International Search Report for application PCT/US2025/047640
dated Jan. 8, 2026.

* cited by examiner

*Primary Examiner* — Michael Forrest
(74) *Attorney, Agent, or Firm* — Sheehan Phinney Bass &
Green PA

(57) ABSTRACT

A method of generating oxygen includes introducing a
hydrogen peroxide solution (at least 39.5%) into a reactor
that has a passage, an oxygen outlet at one end of the
passage, a water outlet at another end of the passage, and an
inlet between the ends of the passage. Silver flakes are
packed tightly within the passage forming interstices to
accommodate fluid flow in a substantially restricted manner
such that substantial fluid flow only occurs under influence
of a pressure differential in the passage that exceeds a
predetermined threshold value associated with the fluid. The
silver flakes catalyze a decomposition reaction of the hydro-
gen peroxide into water and oxygen. The hydrogen peroxide
and the decomposition reaction move in a stepwise, periodic
manner through the interstices from the inlet toward the
water outlet. The oxygen and water vapor flow toward the
oxygen outlet.

18 Claims, 8 Drawing Sheets

100

KEY:
    H = Hydrogen Peroxide line
    O = Oxygen or Oxygen with Water Vapor line
    W = Water line

FIG. 1

H = Hydrogen Peroxide line
O = Oxygen and/or Water Vapor line
W = Water line

OXYGEN PRODUCTION SYSTEM AND METHOD

CROSS-REFERENCE TO RELATED APPLICATION

This application claims the benefit of U.S. Provisional Patent Application No. 63/698,616, which was filed on Sep. 25, 2024 and entitled Continuous Flow Chemical Oxygen Generator, which is hereby incorporated by reference in its entirety.

FIELD OF THE INVENTION

This application relates to oxygen production and, more particularly, relates to a system and method for producing oxygen, especially for use in medical applications.

BACKGROUND

Hydrogen peroxide can be catalyzed to decompose into water and oxygen. The resulting oxygen may be utilized, with or without further processing, for a variety of applications, including medical ones.

SUMMARY OF THE INVENTION

In one aspect, a method of generating oxygen includes introducing a solution comprising hydrogen peroxide into a reactor. The reactor includes: an elongated internal passage, an oxygen outlet at a first end of the elongated internal passage; a water outlet at a second end of the elongated internal passage (opposite the first end); and an inlet for the introduction of the hydrogen peroxide in a middle portion of the elongated internal passage. The middle portion of the elongated internal passage is between the first end and the second end. Silver flakes are packed tightly (approximately 87% (e.g., 70%-90%) of the volume in the passage is occupied by silver flakes) within and substantially fill the elongated internal passage from the first end to the second end. In some implementations, the silver flakes may substantially fill the elongated internal passage by occupying (or being present within) 90% or more (e.g., 95% or more or 98% or more) of the length of the elongated internal passage from the first end to the second end. In some implementations, the packing of the silver flakes, which are thin, may be tight enough so as to not allow the free flow of liquid (e.g., water) at more than one to three drops under atmospheric pressure over a distance of about 8-10" within the elongated internal passage in one minute. In an exemplary implementation, the flakes are 0.005" on average (e.g., 0.005"+/−0.003") thickness and by volume, occupy 87% of the volume (e.g., 70%-90% or 85%-90%) inside the reactor tube (passage). This is the quality control factors use as the flakes are packed 1 cm (0.4") (+/−5%) with each cycle. The flakes may be loaded as a measured amount of silver flakes, then compressed to 1 cm and then the cycle is repeated until the tube is full to a desired length. The flakes, in an exemplary implementation, may be retained between two stainless steel screens that hold the flakes in place at both end of the tube.

The silver flakes form interstices between and around the silver flakes to accommodate fluid flow through the elongated internal passage. The interstices are configured to accommodate fluid flow through the elongated internal passage in a substantially restricted manner. In a typical implementation, the restrictions on flow results at least in part from the small size of the interstices (typically having an average width that is close to (e.g., within 10%-15% of) an average width of the silver flakes) and also from the surface tension that arises between fluid flowing past the surface of the silver flakes. This resistance to flow is such that substantial fluid flow (e.g., more than one or two drops moving a millimeter or less in a 10 second period) only occurs under influence of a pressure differential in the elongated internal passage that exceeds a predetermined threshold value associated with the fluid. A predetermined threshold value required for fluid to flow in a substantial manner through the elongated internal passage may be 1 psi or more (e.g., 2 psi or more, 3 psi or more, 5 psi of more, etc.). In some implementations, liquid may require a higher threshold value for flow to occur than gas (e.g., oxygen). The method includes catalyzing a decomposition reaction of the hydrogen peroxide into water and oxygen with the surface of the silver flakes inside the elongated internal passage. Moreover, the method includes causing the hydrogen peroxide and the decomposition reaction (that results from the hydrogen peroxide contacting the silver flakes) to move in a stepwise, periodic manner through the interstices in the elongated internal passage from the inlet toward the water outlet by periodically opening a first valve connected to the water outlet. In a typical implementation, the periodic opening of the first valve connected to the water outlet exposes the water outlet end of the elongated internal passage of the reactor to low pressure region (e.g., inside a wastewater tank, which may be at or about atmospheric pressure. The method further includes enabling the oxygen and water vapor produced by the decomposition reaction to flow through the interstices toward, and eventually out from, the oxygen outlet. The solution comprising hydrogen peroxide comprises at least 39.5% hydrogen peroxide (e.g., at least 47.5%, at least 49.5%). In some implementations, the solution is no more than 49.5% hydrogen peroxide.

In an exemplary implementation, the space between silver flakes is of variable widths and height that are randomly created as the flakes are pressed together. The flakes maximum width and height are typically approximately no more than one half the diameter of the elongated chamber (tube). As in FIG. 2, a flake of about 3 to 8 mm width would be appropriate for a 16 mm diameter tube. As in FIG. 2, the cone shaped flakes create other spaces of random shapes. In some areas the space is near the thickness and width of a flake and in other areas flakes touch and no space exists. Flakes are 0.005" on average so +/−0.003" is likely a range for practical use. Silver is expensive, so thin flakes are better if they do not fall apart due to the violent reaction.

In another aspect, a system for generating oxygen includes a source of hydrogen peroxide and a hydrogen peroxide reactor coupled to the source of hydrogen peroxide. The hydrogen peroxide reactor has an elongated internal passage, an oxygen outlet at a first end of the elongated internal passage, a water outlet at a second end of the elongated internal passage, and an inlet for the introduction of the hydrogen peroxide in a middle portion of the elongated internal passage, wherein the middle portion of the elongated internal passage is between the first end and the second end. Silver flakes packed tightly within and substantially fill the elongated internal passage from the first end to the second end. The silver flakes form interstices between and around the silver flakes to accommodate fluid flow through the elongated internal passage. The interstices are configured to accommodate fluid flow through the elongated internal passage in a substantially restricted manner such that substantial fluid flow only occurs under influence of a pressure differential in the elongated internal passage that exceeds a predetermined threshold value associated with the fluid. A pump (e.g., a gear pump with a stepper motor, a constant flow or variable flow pump and a check valve, or other pumping configuration) is configured to introduce hydrogen peroxide from the source of hydrogen peroxide to the inlet of the reactor. A valve (e.g., a solenoid valve) is configured to control a flow of water through water outlet of the reactor. The system is operational to: introduce (e.g., with the pump) a solution comprising hydrogen peroxide into the reactor, catalyze a decomposition reaction of the hydrogen peroxide into water and oxygen with the silver flakes inside the elongated internal passage, cause the hydrogen peroxide and the decomposition reaction to move in a stepwise, periodic manner through the interstices in the elongated internal passage from the inlet toward the water outlet by periodically opening a first valve connected to the water outlet, and enable the oxygen and water vapor produced by the decomposition reaction to flow through the interstices toward the oxygen outlet. The solution comprising hydrogen peroxide comprises at least 39.5% hydrogen peroxide.

In yet another aspect, a method of generating oxygen is disclosed. The method includes: (a) introducing hydrogen peroxide via an inlet port to a reactor that contains a catalyst adapted to catalyze a decomposition of the hydrogen peroxide into water and oxygen during a first time segment; (b) ceasing the introduction of hydrogen peroxide into the reactor during a second time segment after the first time segment; (c) enabling water from the decomposition to flow out of the reactor through a water discharge port during a third time segment after the second time segment; (d) preventing water from the decomposition from flowing out of the reactor through the water discharge port during a fourth time segment after the third time segment; (e) repeating steps (a) through (d); and (f) enabling oxygen and water vapor from the decomposition to exit the reactor through an oxygen and water discharge port.

In a typical implementation, the system works by moving a first segment of the reaction cycle (e.g., involving the fluid reactants introduced into the reactor in a first dose) incrementally toward the wastewater outlet 142 port. In an exemplary implementation, the system does not allow the reaction resulting fluid from the first segment to travel to the wastewater outlet port. Fluid from the initial reaction is a hydrogen peroxide in a water solution until fully reacted as it approaches the wastewater outlet. An aspect of certain system implementations is splitting the initial reaction (segment 1) into two parts. One side is gas composed of water vapor and oxygen, and the other side is diluted hydrogen peroxide below the starting concentration. As this $H_2O_2$ solution is of a lesser concentration, the time required to achieve full catalysis is longer and thus, in a typical implementation, this fluid side of the reaction has longer dwell time with the catalyst (than the gas side). The intermittent opening of the wastewater value controls the distance this diluted $H_2O_2$ moves, and the conservation of the exothermic heat and high thermal conductive of silver keeps at least a portion of the reactor above the boiling point of water, and at a temperature that increases the catalytic reaction rate.

In another a system for generating oxygen is disclosed. The system includes a source of hydrogen peroxide and a hydrogen peroxide reactor coupled to the source of hydrogen peroxide. The hydrogen peroxide reactor includes an elongated internal passage having a first end and a second end opposite the first end, a catalyst inside the fluid communication channel and configured to catalyze decomposition of hydrogen peroxide into water and oxygen, an oxygen and water vapor outlet for oxygen and water vapor at the first end of the fluid communication channel, a water outlet for water at the second end of the fluid communication channel, and an inlet for introducing the hydrogen peroxide into the elongated internal passage for contact with the catalyst. The inlet is coupled to the elongated internal passage between the first end and the second end. The system further includes a pump configured to introduce hydrogen peroxide from the source of hydrogen peroxide to the inlet of the reactor, and a valve configured to control a flow of water through the second outlet of the reactor. The system is operational such that the pump introduces hydrogen peroxide from the source of hydrogen peroxide into the reactor during a first time segment, the pump ceases introducing hydrogen peroxide into the reactor during a second time segment that is after the first time segment, the valve opens to enable water to flow out of the reactor through the water outlet during a third time segment that is after the second time segment; and the valve closes to prevent water flow out of the reactor through the water outlet during a fourth time segment that is after the third time segment. In a typical implementation, any oxygen and water vapor that results from the decomposition of hydrogen peroxide in the reactor exits the reactor through the oxygen and water vapor outlet. In a typical implementation, system operation may be controlled by a system controller configured to interact with and control operation of system motors (e.g., for pump(s), etc.) and/or valves (e.g., solenoid valves) to regulate and/or influence flow through the system. In an exemplary implementation, the system controller may include or have access to a timer that keeps track of timing to establish one or more of the aforementioned time segments.

In some implementations, one or more of the following advantages are present.

For example, in a typical implementation, the systems and techniques disclosed herein facilitate a very high level of catalysis, approaching 100% (e.g., above 95%) with hydrogen peroxide concentrations near 50% (e.g., 45% to 60%, 40% to 65%, etc.), and the pressure differentials created in the system disclosed herein may facilitate the continuous or near continuous harvesting of nearly 100% (e.g., 95% or above, 90% or above) of available oxygen.

In a typical implementation, the system may be optimized for 100% (or nearly 100%) catalysis such that $H_2O_2$ in the wastewater is not detectable. As 49.5% (50% nominal) is commonly available and typically cannot maintain a self-sustained reaction, in an implementation of this system, as the reaction proceeds, the wastewater from the reaction involving $H_2O_2$ becomes Water and Oxygen. There is no hydrogen. And the resulting water dilutes the hydrogen peroxide solution such that the reaction slows as the water absorbs the heat. At least 97% catalysis is necessary, and for safety reasons, 99.99% if not 100% as in a few parts per million of $H_2O_2$ is in the wastewater.

In a typical implementation, providing a catalyst reactor with a gas outlet (for oxygen and water vapor) on one side of the hydrogen peroxide input and a wastewater outlet on an opposite side of the hydrogen peroxide input facilitates obtaining substantially all oxygen produced from the catalytic reaction of hydrogen peroxide and silver (or other catalyst) within the reactor. In an exemplary implementation, heat from the exothermic reaction of the catalyst and the hydrogen peroxide quickly elevates the temperature of the catalyst (e.g., to above 100C). In a typical implementation, gas (e.g., oxygen and water vapor) moves towards the lower pressure gas outlet of the reactor while the remaining solution of hydrogen peroxide and water moves towards the wastewater end of the reactor by means of periodically reducing the wastewater end pressure (e.g., by opening a valve there).

In an exemplary implementation, the wastewater produced by the reaction of H2O2 and the catalyst dilutes the concentration of the H2O2 as the reaction progresses. If the reaction starts at room temperature, the exothermic reaction first increases the temperature of the fluid which increases the reaction rate. The wastewater, in some instances, contains nearly 60% of the heat produced while 40% of that heat is in the oxygen (gas). In theory, with enough catalyst surface area rapidly spreading the hydrogen peroxide across the surface area, the reaction produces only water vapor and oxygen gas.

In some implementations, the systems and techniques disclosed herein may be adapted to produce a practical portable oxygen generator for human use. In this regard, a portable device that produces human-use oxygen and is portable will generally be subject to gravity and inertia. Inside the device, if the nominal pressure is nearly equal throughout system, all fluids will behave as they would in atmospheric pressure. This may create problems for controlling the hydrogen peroxide and the water produced in the catalytic reaction. To solve the is problem, implementations of the systems and techniques disclosed herein uses pressure differentials, check valves, and various means of creating flow resistance by means of flow restriction. Flow restriction is related to the behavior of fluids or gas flowing over surfaces, between surfaces, orifice sizes and the length of the paths available for the flow of gas and fluids. Valves further enhance the use of pressure differentials by facilitating the buildup of pressure in one volume above the pressure adjacent to a lower pressure vessel. The valves may be configured to operate in a binary (i.e., on-off) manner or may be or include adjustable orifices to achieve said pressure differentials. Pressure differentials can be used to force both fluids and gas to flow in opposition to gravitational and intertrial or other forces. Without said control, a portable device may not be feasible. This control is also, typically, provided in a fairly simple and straightforward manner.

In a typical implementation, the system works by moving a first segment of the reaction cycle incrementally toward the wastewater outlet port. The system typically does not allow the reaction resulting fluid from the first segment to travel all the way to the wastewater outlet port. The system splits the initial reaction (e.g., segment 1) into two parts. One side is gas composed of water vapor and oxygen, and the other side is diluted hydrogen peroxide below a starting concentration. As this H2O2 solution is of a lesser concentration, the time required to achieve full catalysis is longer and thus this fluid side of the reaction is given longer dwell time with the catalyst. The intermittent opening of the wastewater value controls the distance this diluted H2O2 moves, and the conservation of the exothermic heat and high thermal conductive of silver keeps reactor typically near the boiling point of water, and a temperature that increases the catalytic reaction rate. In a typical implementation, near the initial reaction site, the temperature is preferred to be above boiling but is below boiling at pressure at the wastewater outlet. The internal temperature at the introduction site should be at or higher than the boiling point of water under the nominal pressure. The gas exiting the gas end of the reactor drops in pressure and temperature but water remains in a vapor state. The temperature toward the wastewater outlet decreases until it is at or below the boiling point of water at atmospheric pressure (100C). This drop in temperature creates the water barrier so that oxygen does not escape from the wastewater valve.

In a typical implementation, the entire successful catalysis of the hydrogen peroxide involves incremental movement of the initial reaction to an adjacent location, and repeating of that in order to solve the problem of the reaction diluting itself so that full catalysis is not achieved. The system typically conserves the exothermic heat of the reaction such that in operation, the system operates substantially above 100c, where the external temperature of the reactor may be 105-110C plus.

Other features and advantages will be apparent from the description and drawings, and from the claims.

BRIEF DESCRIPTION OF THE DRAWINGS

FIG. 1 is a partial schematic representation of an exemplary system for producing oxygen.

Like reference characters refer to like elements.

DETAILED DESCRIPTION

Figure 1:
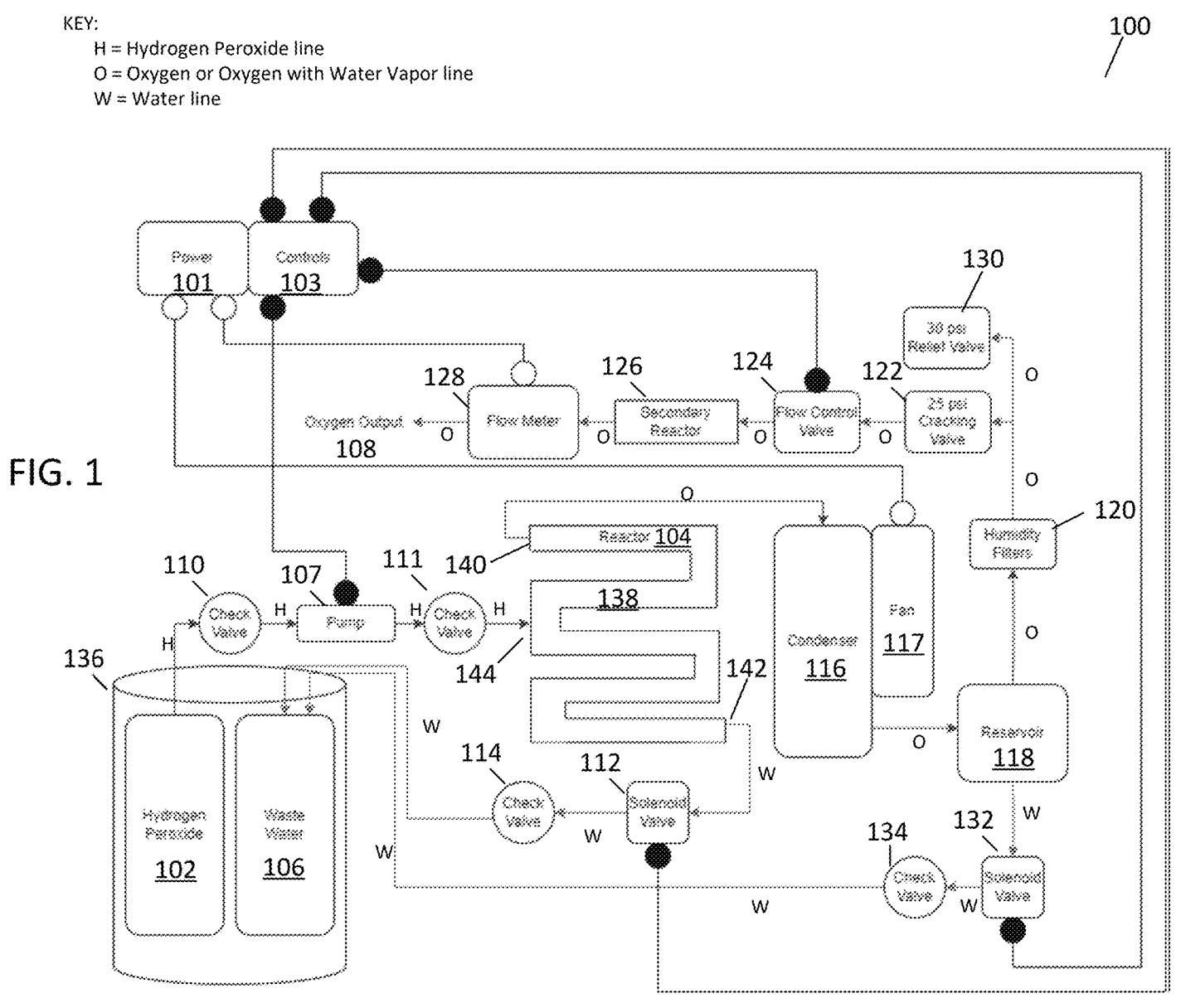
Figure 2:
FIG. 2 is an image showing a group of thin silver flakes of the type that may be packed into an elongated passage of a reactor, next to a ruler marked in inches for scale.

FIG. 1 is a partial schematic representation of an exemplary system 100 for producing oxygen. More specifically, the system 100 is configured and operable to produce oxygen by exposing hydrogen peroxide in a reactor 104 to silver (or some other catalyst) to catalyze the hydrogen peroxide into water and oxygen. The water is directed into a wastewater tank 106 and the oxygen is subjected to further processing and delivered, in a controlled manner, to the system's oxygen output 108.

The reactor 104, in the illustrated implementation, has surfaces that define an elongated internal passage 138 that extends between a first end and a second end that is opposite the first end. The elongated passage 138 in the illustrated implementation is serpentine with a length that is significantly greater than its width. In an exemplary implementation, the passage 138 is tubular. The passage 138 defines a first outlet 140 (for oxygen and, optionally, water vapor) at the first end of the passage 138 and a second outlet 142 (for water) at the second end of the passage 138. In some implementations, including the one represented in the figure, the second outlet 142 is at a lower level than the first outlet 140. The passage 138 also defines an inlet 144 (for hydrogen peroxide) at an intermediate location along the passage 138 between the first and second outlets 140, 142. In some implementations, the inlet 144 may be at a midpoint between the two ends. In some implementations, the inlet 144 may be offset a distance from the midpoint either closer to first end than the second end or vice versa. The inlet 144 in the FIG. 1 implementation, for example, is closer to the first end than the second end so that about 40% of the passage 138 is between the inlet 144 and the first (oxygen) outlet 140 and about 60% of the passage 138 extends between the inlet and the second (water) outlet 142. The exact position of the inlet 144 relative to the first and second ends of the passage 138 can vary. In various implementations, for example, the inlet 144 may be anywhere between the midpoint between the two ends and halfway between the midpoint and the first end of the passage 138.

In a typical implementation, the reactor 104 contains a catalyst, such as silver, that is configured to catalyze the hydrogen peroxide introduced into oxygen and water. The catalyst may be in the form of thin silver flakes in a stacked formation distributed throughout the elongated passage 138. In an exemplary implementation, each thin silver flake has a thickness between about 0.001 inches and 0.02 inches (e.g., between about 0.001 inches and 0.003 inches or between about 0.01 inches and 0.02 inches). Moreover, in a typical implementation, the thin silver flakes have different and irregular shapes and surfaces such that when they are stacked together (e.g., in layers within the elongated passage 138) and lightly compressed, the stacked flakes naturally form small spaces (or interstices) between and around them to enable and facilitate fluid flow, by virtue of pressure differentials, through the passage 138.

FIG. 2 shows an example of a group of thin silver flakes of the type that may be packed into the elongated passage 138 of the reactor 104. The thin silver flakes in the figure are shown next to a ruler marked in millimeters for scale. The silver flakes, as shown, have different and irregular shapes and surface. For example, some of the silver flakes are roughly conical, some are flat (or flatter), some have wrinkled contours, some are smooth (or smoother), some have a textured surface, some have bends or folds, some have no bends or folds, some have flat portions, etc. Moreover, the overall appearance of the flakes vary from flake to flake. Random flake shapes may be advantageous in order to avoid or minimize blockage of fluid pathways through the reactor. Surface tension from the flakes aids in retarding the flow of gas and/or fluids, thus maximizing dwell time for hydrogen peroxide to be in contact with the silver catalyst and react. Moreover, contact between each flake surface and the minimal mass of each flake aids in rapid transfer to exothermic heat, thus achieving a temperature above 100C and preferably 110C or even higher throughout the reactor. The flakes usually have no dimensions longer than about one-half the diameter of the tube. This prevents a single flake from blocking all fluid and gas passage.

In a typical implementation, the silver flakes that are packed tightly into the elongated passage 138 and substantially fill that elongated passage 138 from the first end of the passage 138 to the second end of the passage 138. In an exemplary implementation, the silver flakes are present along at least 80% (e.g., 90% or more, 95% or more, or 100%) of the elongated passage 138. Typically, in portions of the elongated passage 138 where the silver flakes are present, only the aforementioned small spaces between and around the silver flakes are unoccupied by the silver flakes. In a typical implementation, every silver flake that is tightly packed inside the passage 138 is in direct physical contact with at least one other silver flake and at least some of the silver flakes are in direct physical contact with an inner wall of the elongated passage 138 so that any motion of the silver flakes within the elongated passage may be significantly restricted (or prevented) during system operation. The silver flakes provide relatively high surface tension which tends to impede the effects of gravity and/or inertia on the movement or flow of fluid (e.g., liquid, gas, etc.) through the elongated passage 138. In a typical implementation, pressure differentials (e.g., created by system pumps and/or valves) facilitate and control the flow of fluid through the passage 138.

In a typical implementation, the silver flakes may be deliberately manufactured to have different shapes and surfaces such that when stacked in layers inside the passage 138 and lightly compressed so that they create channels (e.g., the small spaces or interstices between and around the flakes). Although different shapes and surfaces can, in some instances, facilitate formation of these channels, the channels may be formed even if some of the flakes are similar to one another as well. The channels tend to provide a high amount of surface area (silver) for the fluid in the channels to contact as the fluid flows through them. In addition, although the cross-sectional profile of the channels varies along the flow path, the cross-sectional area of the channel is typically fairly small, given the packed nature of the silver flakes within the passage 138. In an exemplary implementation, the phrase fairly small refers to an area such that the surface tension provided by the silver flakes and the convoluted through path for fluid and gas between and around the silver flakes does not allow the free flow of a liquid without a pressure differential (e.g., at least 5 psi from the inlet to one of the outlets). The flakes are packed such that all flakes press against other except for naturally occurring channels similar to the thickness of the flakes are left. One metric that may be used in manufacturing is to pack about 1 cm and apply a certain pressure that results in the desired flow characteristics. The thickness of the flakes can vary. However, in some implementations, they are an average of 0.005" in thickness, which may vary from 0.002" to 0.008".

Moreover, in a typical implementation, the channels, formed by lightly packing the silver flakes into the passage 138, are circuitous. The fluid (e.g., hydrogen peroxide, oxygen and/or water vapor, and water) travels along and through these circuitous channels from the inlet to one or more of the outlets through the passage 138 (e.g., from high pressure locations in the passage 138 toward lower pressure locations (e.g., one or more of the outlets)). As the channels tend to be very small, there tends to be a significant degree of surface tension in the channels, sometimes significantly impeding the flow of fluid through the channels. This makes the aforementioned pressure differentials (e.g., resulting from the reactions occurring inside the reactor) to facilitate and/or control the flow of fluid through the passage 138 more significant. In a typical implementation, gas flows more freely than the liquid due to the differential in liquid and gas behavior.

The elongated passage 138 in the reactor 104 silver, which is a particularly desirable catalyst at least in certain implementations for a variety of reasons. First, silver is highly reactive with hydrogen peroxide (H2O2), which decomposes upon contact with the silver into water and oxygen in an exothermic reaction. Moreover, silver has high thermal conductivity, which facilitates rapid transfer of heat from the exothermic reaction into and through the silver, which tends to increase the rate of reaction between the hydrogen peroxide and the silver as the heat spreads. Additionally, silver is ductile and, therefore, relatively easy to bend or shape, which is helpful for compressing the flakes as they are packed into the elongated passage 138. For medical use, silver is ideal as it is non-toxic in contrast to some other catalysts. Moreover, silver does not degrade or get consumed by reacting with hydrogen peroxide; it merely catalyzes the decomposition of the hydrogen peroxide into water and oxygen.

Figures 3A, 3B, 3C:
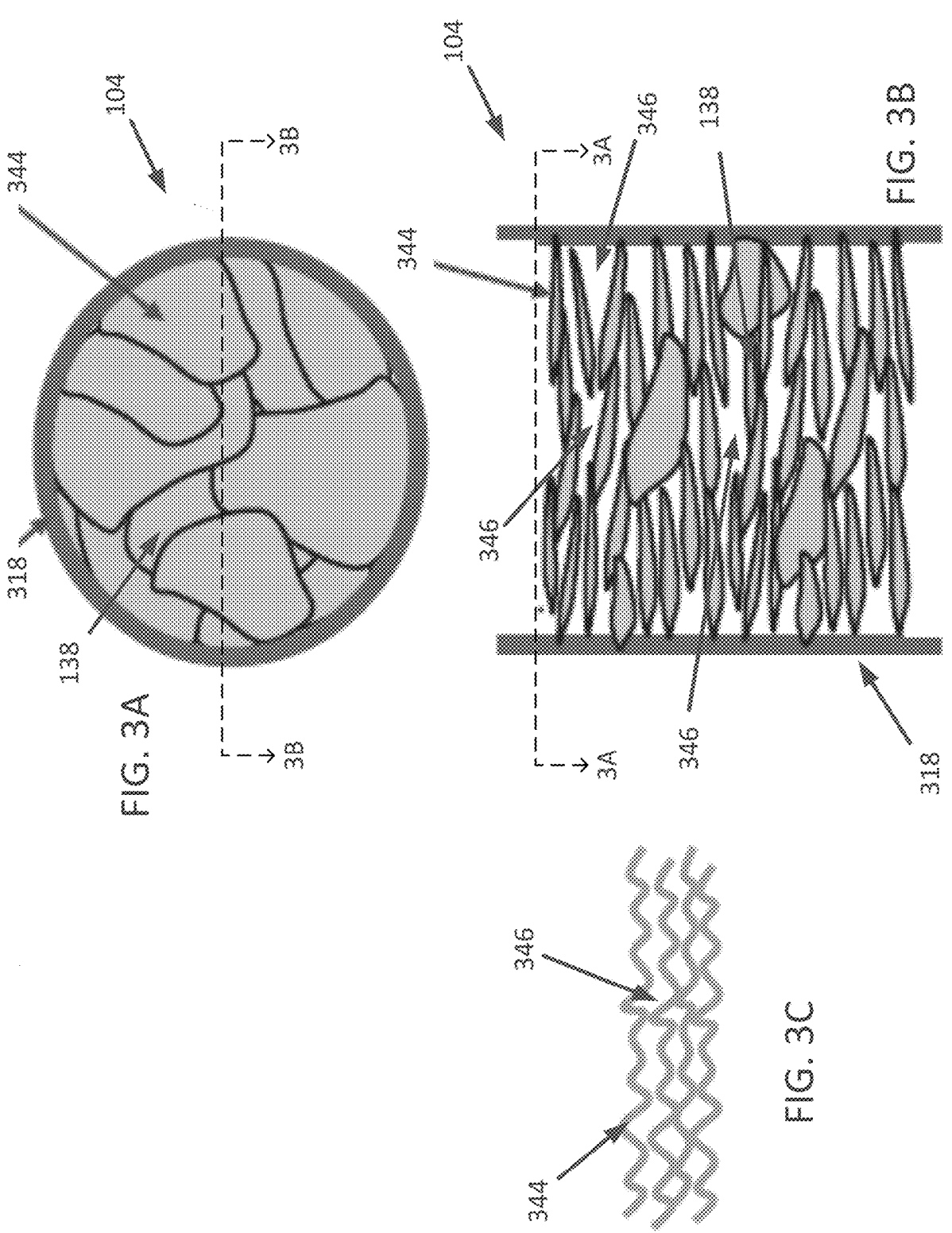
FIG. 3A is an axial-facing sectional view of a reactor lightly packed with silver flakes.
FIG. 3B is a side-facing cross-sectional view showing a short length of the elongated passage in FIG. 3A.
FIG. 3C is a cross-sectional side view showing four stacked, irregularly shaped silver flakes with small spaces (e.g., interstices) therebetween.

FIGS. 3A and 3B show a section of the reactor 104, specifically, a section of the elongated passage 138 in the reactor 104, lightly packed with silver flakes 344. More specifically, FIG. 3A is a cross-sectional view of the elongated passage 138 looking axially into passage 138 and FIG. 3B is a side cross-sectional view showing a short length of the elongated passage 138. The silver flakes 344 are clearly visible and stacked in an overlapping fashion with one another inside the passage 138. The silver flakes 344 have different and shapes and sizes (and surfaces) and form, in their lightly compressed and stacked configuration, small spaces (or interstices 346) between them and around them to facilitate fluid flow through the passage 138.

As shown in FIG. 3A, the passage 138 has a circular cross-section, with a diameter, and is surrounded by a wall 318. In an exemplary implementation, the cross-sectional diameter of the passage 138 is between 0.4 inches and 0.9 inches (e.g., between 0.5 inches and 0.8 inches, or between 0.6 inches and 0.7 inches), but it could be smaller or larger. In a typical implementation, the cross-sectional diameter of the passage 318 is related to flake size and/or maximum fluid flow rate through the passage 318 of the reactor 104 In an exemplary implementation, the wastewater side is twice the length of the gas outlet side. The gas outlet side has typically been about 8" to 10" long, minimum. With a 0.6" diameter, the gas outlet side is around 12× the diameter or more and the water outlet side about 24× the diameter. This is also in proportion to the silver flakes as each flake is typically between ¼ and ½ of the diameter of the tube.

FIG. 3C shows an example of a cross-sectional side view of four stacked, irregularly shaped silver flakes 344, with small spaces (e.g., interstices 346) therebetween.

Referring again to FIG. 1, in addition to the reactor 104, the illustrated system 100 has a power source 101, a controller 103, a hydrogen peroxide supply subsystem, an oxygen processing and delivery subsystem, and a wastewater handling subsystem. The power source 101 can be virtually any kind of power source including, for example, a battery, a generator, a wall outlet, etc. The power source 101 in the illustrated implementation is configured to and does supply power to various system components (including, for example, a flow meter and a fan for the condenser). The controller 103 can be virtually any kind of controller including, for example, a computer-based controller (e.g., with computer memory and one or more computer processors). The controller may include hardware (e.g., the computer processor(s) and memory) that can execute timer functionalities. In addition, the controller may receive inputs (from system pressure and temperature sensors, for example), process those sensor inputs and control one or more aspects of system operation accordingly (e.g., in response to the sensor inputs and/or the timer functionalities). In the illustrated implementation the controller 103 interfaces with and/or controls various system components (including, for example, a motor or motor controller for the hydrogen peroxide pump, flow control valve, and solenoid valves). FIG. 1 shows electrical lines connecting these various components to the power source 101 and the controller 103. In an exemplary implementation, the system controller 103 may include or have access to a timer that keeps track of timing to establish one or more (or all) of the time segments referred to herein. In various implementations, the power supply 101 and controller may supply power to and/or control other system components as well. In an exemplary implementation, the controller 103 may implement an algorithm to enable system operations disclosed herein including, for example, those represented in FIG. 5.

The hydrogen peroxide supply subsystem is configured to supply hydrogen peroxide into the reactor 104. The hydrogen peroxide supply subsystem in the illustrated system 100 includes a source of the hydrogen peroxide (which in the illustrated system 100 is a hydrogen peroxide tank 102), a pump 107 for pumping hydrogen peroxide from the hydrogen peroxide tank 102 to the reactor 104, a first check valve 110 between the hydrogen peroxide tank 102 and the pump 107, a second check valve 111 between the pump 107 and the reactor 104, and fluid communication lines connecting these components to one another as shown. In a typical implementation, the check valves prevent the back flow of fluids through the pump back into the hydrogen peroxide, as a few small particles of silver would start a reaction in the $H2O2$. The pump 107 in a typical implementation is powered by a motor and is a positive displacement pump (e.g., a gear pump or the like). Each of the check valves 110 and 111 is configured to allow fluid flow (e.g., air flow) in one direction only. Specifically, the check valve 110 is configured to allow fluid flow only from the hydrogen peroxide tank 102 to an inlet of the pump 107 but to block fluid flow in the opposite direction (i.e., to prevent fluid from flowing back into the hydrogen peroxide tank 102 from the pump 107. Likewise, check valve 111 is configured to allow fluid flow only from the outlet of the pump 107 to the inlet (at 144) on the reactor 104, but to block fluid flow in the opposite direction (i.e., to prevent fluid from flowing back toward the pump from the reactor 104).

In general, the pump 107 should be capable of producing enough pressure push through the check valve 111 under all system operating conditions, even as pressure increases in the reactor 104 due to the catalytic reaction of hydrogen peroxide into oxygen and water in the reactor 104. In fact, in a typical implementation, the pump 107 should be capable of producing enough pressure to continue pushing through the check valve 110 despite any spikes in pressure that may occur (e.g., in the reactor 104) by virtue of the catalyzing reaction happening there. In a typical implementation, the check valve 110 (and other system check valves) may have a relatively low cracking pressure in its flow direction and "lock out" in the reverse direction to block flow. The check valve on the pump also may prevent siphoning and could, alternatively, be on the fluid inlet side of the pump.

In an exemplary implementation, the system 100 has a nominal pressure between 20 psi and 25 psi; though that range can vary (e.g., 15 psi to 25 psi, etc.). The peak reaction pressure, in an exemplary implementation, may be 30 psi (+/−5 psi, etc.). In a typical implementation, the pump 107 may have a maximum operating pressure between 45 psi and 180 psi. In some implementations, the system delivers doses of hydrogen peroxide into the reactor 104 in a pulsed manner. In pulse dosing, the hydrogen peroxide is pushed into the reactor 104 (e.g., by pump 107) intermittently (or in "pulses") rather than continuously. Instead of delivery taking place at a steady rate during a hydrogen peroxide delivery period, in pulse dosing, deliveries typically take place during a sequence of short, typically pre-defined, periods of time (pulses) separated by short breaks.

The line(s) that extend out from the hydrogen peroxide tank 102 to the reactor 140 (labeled H in the figure) is (are) connected to the inlet of the reactor 104 and deliver hydrogen peroxide from the tank 102 to the inlet of the reactor 104.

The oxygen processing and delivery subsystem in the illustrated system 100 is connected to the oxygen outlet of the reactor 104 and is configured to receive oxygen (optionally mixed with water vapor) from the oxygen outlet of the reactor 104. The oxygen processing and delivery subsystem in the illustrated system 100 includes a condenser 116, a reservoir 118, humidity filter(s) 120, a pressure relief valve 130, a cracking valve 122, a manual flow control valve 124, a secondary reactor 126, a flow meter 128, and an oxygen output 108.

The condenser 116 can be virtually any kind of heat exchanger configured to condense a gaseous substance (e.g., the water vapor in the oxygen coming from the reactor 104) into a liquid (e.g., water). The condenser 116 in the illustrated implementation is configured to enable and facilitate the transfer of heat from the water vapor/oxygen mixture to a secondary fluid (e.g., cooling water) or the surrounding air In the illustrated implementations, there is a cooling fan 117 blowing air (e.g., onto condenser tubes carrying the oxygen/water vapor mixture) to facilitate condensation. Heat transfer in the condenser typically involves a phase change (e.g., from water vapor to liquid water).

The oxygen and the liquid water are separate from one another in the reservoir 118, which is connected to and downstream of the condenser 116 as shown. In some implementations, the reservoir 118 may be integrated into and form a part of the condenser 116. As represented in the illustrated schematic, the reservoir has two outlets-a first outlet for oxygen and a second outlet for the condensed water. In a typical implementation, the water vapor and oxygen separate in the reaction and not in the condenser. The gas is water vapor mixed with oxygen. The water vapor may become liquid water by 1) the drop in pressure from the reactor and then 2) by the heat exchanging that is a function of the condenser and lowers the temperature of the gas. Water drops into the bottom of the reservoir located after the condensing stage and via gravity, but preferred may be periodically pulled into a water permeable materials when the wastewater reservoir is periodically opened to dump water. In some implementations, to support the feature of inverted use, the reservoir may employ the same surface tension principles as the reactor to impede the flow of condensed water under different angles of orientation or inertial forces relative to gravity.

In a typical implementation, there are two places in the system where wastewater is collected. One is at the wastewater end of the reactor (e.g., near 142) and the other is in the condensed wastewater reservoir 118 or collection location. There are valves 112, 132 that control wastewater flow out of each of these places. Both of the valves 112, 132 control flow through a fluid flow path that is directed to the wastewater tank 106. In a typical implementation, these two valves 112, 132 should not open at the same time or are protected (as shown) by check valves 114, 134. Otherwise, the system pressure could back feed into the reactor wastewater port and not let the incremental movement of H2O2 occur. Thus, in some implementations, solenoid valve 132 may be operated so that it is always closed whenever solenoid valve 112 is open.

Next, the oxygen processing and delivery subsystem has one or more humidity filter(s) 120 downstream of the condenser 116 and reservoir 118. In a typical implementation, each of the humidity filters 120 is a moisture filter configured to reduce the moisture content in a gaseous substance. In the context of the illustrated oxygen processing and delivery subsystem, each humidity filter 120 is configured to reduce moisture content in the oxygen flowing through the humidity filter 120. In an exemplary implementation, each humidity filter may include a hydrophobic membrane configured to resist the passage of water (and/or other liquid or solid substances) but to enable the passage of any gases (e.g., oxygen). In an exemplary implementation, the humidity filter(s) 120 reduce the humidity of the fluid contained therein from 80%-90% humidity to 40%-60% humidity. In a typical implementation, the humidity of the oxygen/water vapor is in the 80%-90% range from the outlet of the reactor 104 to the humidity filter(s) 120.

Downstream of the humidity filter(s) 120, the oxygen processing and delivery subsystem includes a cracking valve 122 and a relief valve 130 that define two alternative fluid flow paths for the oxygen exiting the humidity filter(s) 120. In a typical implementation, the cracking valve 122 is a check valve configured to allow fluid flow (e.g., oxygen flow) through it in only one direction. The cracking valve 122 in the illustrated implementation has a cracking pressure of 17 to 20 pounds per square inch (psi). Cracking pressure (or opening pressure) refers to the minimum pressure differential needed between the inlet and outlet of the cracking valve 122 at which the first indication of flow occurs. Thus, in a typical implementation, the cracking valve 122 in system 100 remains closed until and unless the pressure differential across the cracking valve 122 reaches 17 to 20 psi, at which point, the cracking valve 122 opens, typically automatically, to allow oxygen to flow to system components that are downstream of the cracking valve 122. Thus, during normal system operation, the cracking valve 122 may cycle open and closed, based on the pressure differential across the cracking valve 122, to control the flow of oxygen through the cracking valve 122. Although the cracking valve 122 in the illustrated implementation is configured to operate at 25 psi, in various implementations, the cracking valve 122 may be configured to operate at a different pressure (e g., between 20 psi and 30 psi, 15 psi and 35 psi, etc.).

The relief valve 130 is safety device configured to control or limit pressure in a system, by releasing excess pressure (e.g., to atmosphere), if needed. The relief valve 130 in the illustrated system 100 is configured to automatically release excess pressure (e.g., from the lines that connect the humidity filter(s) 120 to the cracking valve 122) if the pressure in those lines reaches or exceeds 30 psi. Although the relief valve 130 in the illustrated implementation is configured to operate at 30 psi, in various implementations, the relief valve 130 may be configured to operate at a different pressure (e.g., between 25 psi and 35 psi, 20 psi and 40 psi, etc.). That said, in a typical implementation, the cracking valve 122 should be configured to operate at a lower pressure than the relief valve 130 is configured to operate.

Next, downstream of the cracking valve 122, the oxygen processing and delivery subsystem includes a flow control valve 125. The flow control valve 125, which is manually controlled in the illustrated implementation, can be opened or closed (e.g., by hand) to control the flow of oxygen to the secondary reactor 126, the flow meter 128, and the system oxygen output 108.

The secondary reactor 126 is downstream of the flow control valve 125 and upstream of the flow meter 128. In a typical implementation, the secondary reactor 126 contains additional catalyst (e.g., silver flakes) and is configured to catalyze hydrogen peroxide, if any, that may have found its way to this point in the system, which is highly unlikely. The secondary reactor 126 may be similar to (but is typically significantly smaller than) reactor 104. In particular, in an exemplary implementation, the secondary reactor 126 may have surfaces that define an internal passage that extends between an inlet (at first end of the secondary reactor 126) and an outlet (at a second end of the secondary reactor 126). The internal passage, through which fluid will flow, may contain a catalyst, such as silver, that is configured to catalyze the hydrogen peroxide introduced into oxygen and water. The silver may be in the form of thin silver flakes in a stacked, lightly compressed, formation distributed throughout the elongated passage 138. Any water produced by the secondary reactor 126 may be drained (e.g., to atmosphere or to a wastewater tank, such as 106).

The flow meter 128 is downstream of the secondary reactor 126. The flow meter 128 in a typical implementation is a device that controls and measures the flow rate of oxygen delivered to the system output 108 (e.g., and to a patient). The flow control, in some implementations, could be by means of flow orifice diameters and manual, and assuming the system maintains a pressure range. In some implementations, the ideal pressure range in operation may be about 17 PSI to 25 PSI, with an even more optimal range at 20 to 25 PSI. The minimum pressure valve opens around 17 PSI and the safety over-pressure value is at 30 PSI. So, a nominal 22.5 PSI+/−2.5 PSI may be used.

The wastewater handling subsystem in the illustrated implementation facilitates the removal and disposal of wastewater (e.g., to wastewater tank 106) from the reactor 104 and from the reservoir 118.

The portion of the wastewater handling subsystem that facilitates the removal and disposal of wastewater from the reactor 104 is attached to the outlet of the reactor 104 at the second end 142 thereof. Moreover, the portion of the wastewater handling subsystem that facilitates the removal and disposal of wastewater from the reactor 104 includes a solenoid valve 112, a second check valve 114, the wastewater tank 106, and fluid lines connecting those components as shown. A solenoid valve is an electromechanical device used to control the flow of fluid (e.g., liquid and/or gas) through a fluid line. In an exemplary implementation, a solenoid valve may include an electric coil and a movable plunger. The solenoid valve 112, in a typical implementation, may be responsive to a signal from a system controller that dictates opening and closing of the solenoid valve to allow or prevent water flow out of the reactor 104 and to the wastewater tank 106. In some alternative implementations, the solenoid valve 112 may be replaced by a variable orifice that defines a small opening for allowing limited flow therethrough.

The second check valve 114 is downstream of the solenoid valve 112, between the solenoid valve 112 and the wastewater tank 106. The second check valve 114 in the illustrated system 100 is configured to allow fluid flow (e.g., water flow) in one direction only. Specifically, the check valve 114 in the illustrated implementation allows fluid flow from the reactor 104 and solenoid 112 to the wastewater tank 106 but blocks or restricts any fluid flow in the opposite direction.

The portion of the wastewater handling subsystem that facilitates the removal and disposal of wastewater from the reservoir 118 is attached to a water outlet on the reservoir (typically at the bottom of the reservoir 118). Moreover, the portion of the wastewater handling subsystem that facilitates the removal and disposal of wastewater from the reservoir 118 includes a solenoid valve 132, a third check valve 134, the wastewater tank 106, and fluid lines connecting those components as shown. Solenoid valve 112, in a typical implementation, may be responsive to a signal from a system controller that dictates opening and closing of the solenoid valve to allow or prevent water flow out of the reservoir 118 and to the wastewater tank 106. In some alternative implementations, the solenoid valve 112 may be replaced by an orifice that defines a small opening for allowing limited flow therethrough, or can be a proportional valve with a variable orifice size.

The third check valve 134 is downstream of the solenoid valve 132, between the solenoid valve 132 and the wastewater tank 106. The third check valve 134 in the illustrated system 100 is configured to allow fluid flow (e.g., water flow) in one direction only. Specifically, the third check valve 134 in the illustrated implementation allows fluid flow from the reservoir 118 and solenoid 132 to the wastewater tank 106 but blocks or restricts any fluid flow in the opposite direction.

The system 100 in FIG. 1 may be operated in any number of a variety of ways. One particularly effective way is described as follows. In a typical implementation, the system 100 includes a controller (e.g., 103 in FIG. 1) that controls various system functionalities including one or more of those described here, with reference to FIG. 4.

Figure 4:
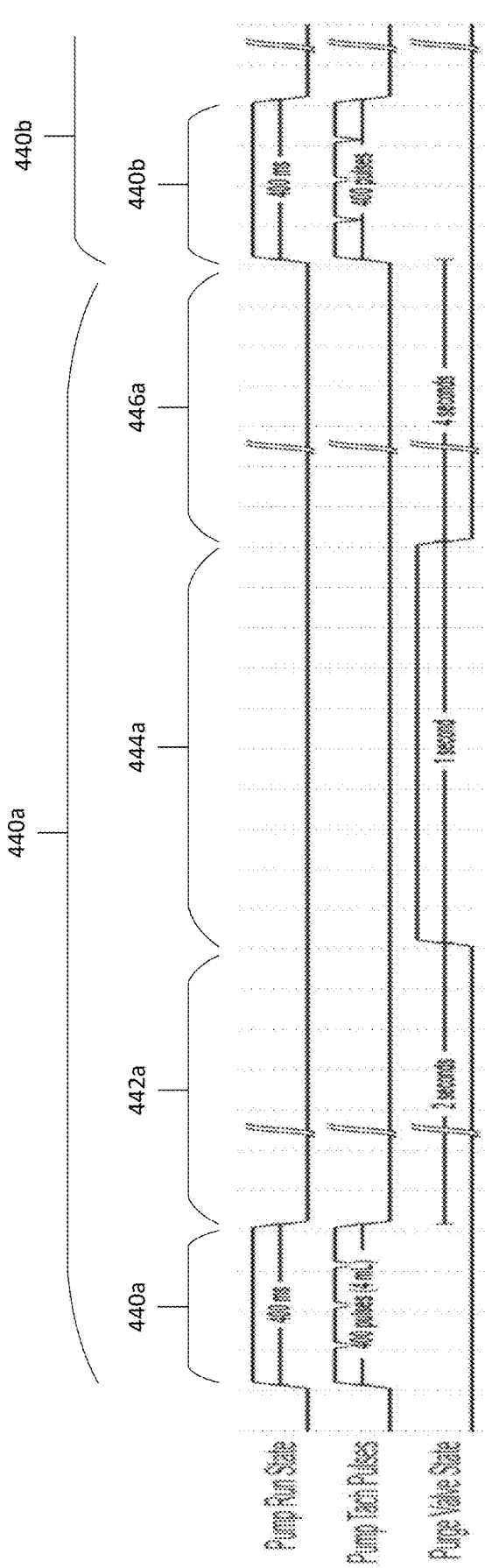
FIG. 4 is a timing diagram that represents timing involved in controlling operation of pump and solenoid valve.

FIG. 4 is a collection of timing diagrams on a common (horizontal) time axis. The time axis is divided into several different consecutive time segments 440a, 442a, 444a, 446a, and 440b. The timing diagrams respectively represent timing involved in operation of the pump 107 in the system 100, a tachometer for the pump 107, and the solenoid valve 112 in the system 100. More specifically, the illustrated collection of timing diagrams includes a first timing diagram that represents pump run states (for pump 107), a second timing diagram that represents pump tach pulses (for pulses produced by a tachometer for the pump 107), and a third timing diagram that represents a purge valve state (for solenoid valve 112). The options for the pump run state represented in the first timing diagram include a pump running state (shown in time segments 440a and 440b, for example) and a pump not running state (shown in time segments 442a, 444a, and 446a). The options for the pump tach pulses include pulsing (when the pump is running) and not pulsing (when the pump is not running). The options for the purge valve state include the solenoid valve 112 being closed (in time segments 440a, 442a, 446a, and 440b) and the solenoid valve 112 being open (in time segment 444a). The purge valve (or solenoid valve 112) also may be referred to as a reactor wastewater valve and is at the water outlet of the reactor 104. The algorithm of operating the pump (107) and the solenoid valve (112) can include a state where the pump (107) flow rate is reduced and increased while the solenoid valve is replaced by a proportional valve and that is variable from nearly closed to open and thus having the same effect of dividing the initial reaction into two subsequent directions of flow.

The reactor control algorithm represented by the timing diagram of FIG. 4 shows the frequency of the reactor wastewater valve (e.g., solenoid valve 112) opening from a normally closed state to an open state (to expose the elongated internal passage 138 of the reactor 104 to or near atmospheric pressure). The H2O2 can be delivered into the reactor 104 by operation of the pump 107. It has been observed that, in an exemplary implementation, using hydrogen peroxide (H2O2) at approximately 49.5% concentration, 65% of the reaction moves to the Reactor Gas Outlet near one end 140 of the reactor 104 and approximately 35%

(e.g., 25% to 50% or 35% to 50%) to the reactor wastewater valve 112 on the water outlet side of the reactor 104.

In a typical implementation, the opening of the reactor wastewater valve 112 is 1 to 2 seconds on a 5 to 30 second interval. Observed efficient cycles at 5 seconds to 12 seconds are as follows using the pulsed hydrogen peroxide delivery; the algorithm is (1) the full dose may be delivered nearly instantaneously and typically in less than one second (e.g., about 400 milliseconds, which may include, for example, 300 milliseconds to 500 milliseconds, 200 milliseconds to 600 milliseconds, 100 milliseconds to 700 milliseconds, etc.), then (2) pause 2-5 seconds before (3) opening the reactor wastewater valve 112 for 1-2 seconds, and then (4) a pause of 2-5 seconds (this pause may be a different duration than the first pause) before a new cycles starts. Cycles of more than 12 seconds, and even more than 15 seconds, have been observed as successful, and in theory, instead of the reactor wastewater valve 112 pulse valve, this valve may be variable orifice that restricts fluid flow. This could be accomplished through an electronic variable orifice valve or fixed small orifice and an on-off solenoid valve. The length of each complete pump and valve cycles and the variation of the gas output flow rate is also dependent on the total gas volume of the entire system. Where the condensed wastewater reservoir after the condensing stage is a very small, the cycle needs to be short in order to avoid highly variable gas flow rates and where the total system gas volume is higher, the cycle can be much longer as the gas volume acts to keep the flow rate near constant due to pressure changes absorbed by the large gas volume.

The FIG. 4 timing diagram shows a particular example of this kind of algorithm. The illustrated algorithm represents one full operational cycle 440a of the system 100 and the beginning of a subsequent operational cycle 440b. The full operational cycle 440a according to the illustrated implementation includes a first hydrogen peroxide delivery period 440a, followed by a first idle period 442a, then a reactor water purging period 444a, and finally a second idle period 446a. The subsequent operational cycle 400b begins after that with a second hydrogen peroxide delivery period 440b and includes the same sequence of periods in the same order as the full operational cycle 400a.

During the first hydrogen peroxide delivery period 440a, the pump (e.g., 107) runs to deliver a dose of hydrogen peroxide into the reactor (e.g., 104). According to the illustrated example, the pump 107 delivers hydrogen peroxide to the reactor 104 over a period of 400 milliseconds delivering 4 milliliters of hydrogen peroxide into the reactor 104. The tachometer for the pump 107, according to the illustrated example, produces 400 pulses during this period of time. The first hydrogen peroxide delivery period 440a has a start point (when the pump 107 starts running) and an end point (when the pump 107 stops running) represented respectively by the rise and fall in the illustrated "Pump Run State" trace. The purge valve (i.e., reactor wastewater valve 112) is and remains closed (e.g., preventing fluid flow) throughout the entirety of the first hydrogen peroxide delivery period 440a.

The hydrogen peroxide introduced into the reactor 104 during the first hydrogen peroxide delivery period 440a begins to react with the silver catalyst located inside the reactor 104 very close to the hydrogen peroxide reactor inlet 144. In a typical implementation, flow is restricted within the elongated internal passage 138 of the reactor 104 during timing segment 440a, particularly between the inlet 144 and the second (wastewater) outlet 142. More specifically, flow is restricted between the inlet 144 and the second (wastewater) outlet 142 because the tight packing of the silver flakes inside the reactor 104 impedes or limits the movement of the fluid reactant from the inlet 144 toward the second (wastewater) outlet 142 in the reactor 104. Additionally, the reaction, at this point (timing segment 440a), has only just begun and, therefore, typically, the pressure, local the reaction site (in the elongated internal passage 138), is still relatively low, though starting to build. Finally, the purge valve 112 is and remains closed throughout the first hydrogen peroxide delivery period 440a, which further discourages flow in from the inlet 144 to the second (wastewater) outlet 142. In essence, since the silver flakes are so tightly packed and there is very little, if any, pressure differential between the reaction location and the second (wastewater) outlet 142 during time segment 440a, the fluid reactant typically moves little to not at all towards the second (wastewater) outlet 142 during time segment 440a.

The tightly packed silver flakes impede or limit the movement of the fluid reactant from the inlet 144 toward the first (oxygen and water vapor) outlet 140 as well. However, since there is no valve or other component to restrict fluid flow out of the first outlet 140, in a typical implementation, as the pressure at the reaction site in the reactor 104 increases, the fluid reactant inside the elongated internal passage 138 begins to advance through the tightly packed silver flakes toward the first (oxygen and water vapor) outlet 140.

Thus, in a typical implementation, during time segment 440a, the reaction inside the reactor 104 is just beginning and typically remains very close to the inlet, with the fluid reactant moving more towards the first (oxygen and water vapor) outlet 140 end of the reactor 104 than towards the second (wastewater) outlet 142 end of the reactor 104. Moreover, of course, the reaction itself starts to spread from the inlet toward both ends of the reactor 104 (i.e., the first (oxygen and water vapor) outlet 140 end and the second (wastewater) outlet 142 end), spreading more towards the first (oxygen and water vapor) outlet 140 end than the second (wastewater) outlet 142 end. In a typical implementation, the fluid reactant and the reaction itself are contained to portions of the elongate internal passage 138 near the inlet 144. Typically, at this point during reactor operation (initial time segment 440a), neither the fluid reactant, nor the reaction itself, nor any of the resulting oxygen or water will have reached the first (oxygen and water vapor) outlet 140 or the second (wastewater) outlet 142.

Next, in the illustrated collection of timing diagrams, immediately following time segment 440a, is a first idle time segment 442a. The first idle time segment 442a in the illustrated example lasts two seconds. Throughout an entirety of the first idle segment 442a, the pump 107 is and remains off (i.e., not operating). Moreover, throughout the first idle segment 442a, the purge valve 112 is and remains closed.

During this first idle time segment 442a, typically, no additional hydrogen peroxide is being introduced into the reactor 104. The hydrogen peroxide that was introduced previously into the reactor 104 (e.g., during time segment 440a), however, continues to react with the silver flakes inside the reactor 104 to produce water and oxygen. Additionally, the fluid reactant and the reaction itself continue to spread through the elongated internal passage 138 during time segment 442a impeded somewhat by the tightly packed silver flakes. As above, the spreading occurs more the direction of the first (oxygen and water vapor) outlet 140 end or the reactor 104 than the second (wastewater) outlet 142 end of the reactor 104. Meanwhile, temperature and pressure typically continue to build wherever the reaction is occurring inside of the reactor 104. Check valve 111 prevents the backflow of fluid (e.g., hydrogen peroxide) from the reactor 104 back towards the idle pump 107 during time segment 442a. Typically, at this point during reactor operation (initial time segment 440a), neither the fluid reactant, nor the reaction itself, nor any of the resulting oxygen or water will have reached the first (oxygen and water vapor) outlet 140 or the second (wastewater) outlet 142.

A purge valve open time segment 444a, which lasts one second in the illustrated example, follows the idle time segment 442a. The purge valve open time segment 444a begins when the purge valve 112 opens and ends when the purge valve 112 closes. The pump 107 is and remains off throughout an entirety of the purge valve open time segment 444a. In a typical implementation, the opening of the purge valve 112 opens, which starts he purge valve open time segment 444a, establishes a fluid flow path between the elongate internal passage 138 of the reactor 104 and the wastewater tank 106. In a typical implementation, the pressure inside the wastewater tank 106 is at atmospheric pressure (e.g., close to or at zero psi). Meanwhile, the reaction inside the reactor 104 continues, with the pressure at the reaction site(s) within the reactor 104 at an elevated level, at least relative to the pressure inside the wastewater tank 106. This pressure differential, in a typical implementation, is large enough to cause some of the fluid reactant and the reaction itself to move within the elongated internal passage 138 from the reactor inlet 144 toward the second (wastewater) outlet 142. The distance that the fluid reactant and reaction move during this purge valve open time segment 444a is typically small (e.g., less than 20%, less than 15%, or less than 10% of the total linear distance between the inlet 144 and the second (wastewater) outlet 142 through the elongated internal passage 138). One reason why the distance that the fluid reactant and reaction move such a small amount towards the second (wastewater) outlet 142 during this time segment 444a is because the silver flakes are packed together tightly enough to impede or restrict a greater degree of fluid flow. Once the purge valve 112 closes, the purge valve open time segment 444a ends. At that point, the fluid reactant and reaction substantially stop advancing towards the second (wastewater) outlet 142, but the fluid reactant that moved away from the inlet 144 and towards the second (wastewater) outlet 142 remain in that portion of the elongated internal passage 138 (between inlet 144 and outlet 142) and continue to react with the silver flakes surrounding them. Meanwhile, in a typical implementation, the fluid reactant and the reaction itself may continue to advance towards the first (oxygen and water vapor) outlet 140, impeded or restricted by the tight packing of the silver flakes. The temperature and pressure inside the reactor 104 typically continues to rise during this time segment 444a.

The second idle time segment 446a, which lasts four seconds in the illustrated example, follows the purge valve open time segment 444a. Throughout an entirety of the second idle time segment 446a, the pump 107 is and remains off (i.e., not operating). Moreover, throughout the second idle time segment 446a, the purge valve 112 is and remains closed. During this second idle time segment 446a, the fluid reactant continues to react in the portions of the reactor 104 where the fluid reactant has reached. Moreover, in some implementations, the fluid reactants and the reaction itself may continue to slowly advance, impeded or restricted by the tightly packed silver flakes, towards the first (oxygen and water vapor) outlet 140. On the second (wastewater) outlet 142 side of the inlet, however, the fluid reactants and the reaction itself typically does not continue to advance towards the second (wastewater) outlet 142 during this time segment 446a.

The subsequent operational cycle 400b is essentially a repeat of the first operational cycle 400a and begins after the second idle period 446a with the second hydrogen peroxide delivery period 440b. At some point, the fluid reactant and reaction will have advanced towards the first (oxygen and water vapor) outlet 140 as much as they are going to advance toward the first (oxygen and water vapor) outlet 140 during system operation. The amount that the fluid reactant and reaction ultimately advance towards the first (oxygen and water vapor) outlet 140 can vary from implementation to implementation. In a typical implementation, the amount is between 10% and 60% (e.g., between 20% than 50%) of the distance from the inlet 144 to the first outlet 140 through the elongated internal passage 138. Typically, the fluid reactant reaches this point by the end of the second or third operational cycle 400b. Subsequent operational cycles (not represented in FIG. 4) follow the second and third operational cycles. In a typical implementation, the fluid reactant and the reaction advances more slowly towards the second (wastewater) outlet 142 (than towards the first outlet 140). Moreover, the distance between the inlet 144 and the second (wastewater) outlet 142 inside the elongated internal passage 138 is typically longer than the distance between the inlet 144 and the first (oxygen and water vapor) outlet 140 and the first. Therefore, in a typical implementation, it takes more operational cycles for the fluid reactant and the reaction to advance towards the second (wastewater) outlet 142 as much as they are going to advance toward the second (wastewater) outlet 142 during system operation. The amount that the fluid reactant and reaction ultimately advance towards the first (oxygen and water vapor) outlet 140 can vary from implementation to implementation. In a typical implementation, the amount is greater than 50% (e.g., greater than 55%, greater than 60%, greater than 65%) of the distance from the inlet 144 to the second outlet 142 through the elongated internal passage 138.

Ultimately, the reactor 104 reaches a steady state operating condition, where the reactants are reacting on both sides of the inlet 144 but neither the fluid reactants or the reaction itself is advancing any further along towards either the first (oxygen and water vapor) outlet 140 or the second (wastewater) outlet 142. In that state, the reactions are yielding both oxygen (typically with some water vapor) that flows through the interstices between and around the silver flakes to and then out of the first (oxygen and water vapor) outlet 140, and wastewater which is periodically released from the second (wastewater) outlet 142. The oxygen (and water vapor) is directed to the condenser 116, while the wastewater is directed to the wastewater tank 106. In this manner, the system 100 operates to deliver hydrogen peroxide into the reactor 104 and to remove water from (or purge) the reactor. At the same time, oxygen is removed from the reactor and delivered to the oxygen output 108 for use by a medical patient, for example.

Figure 5:
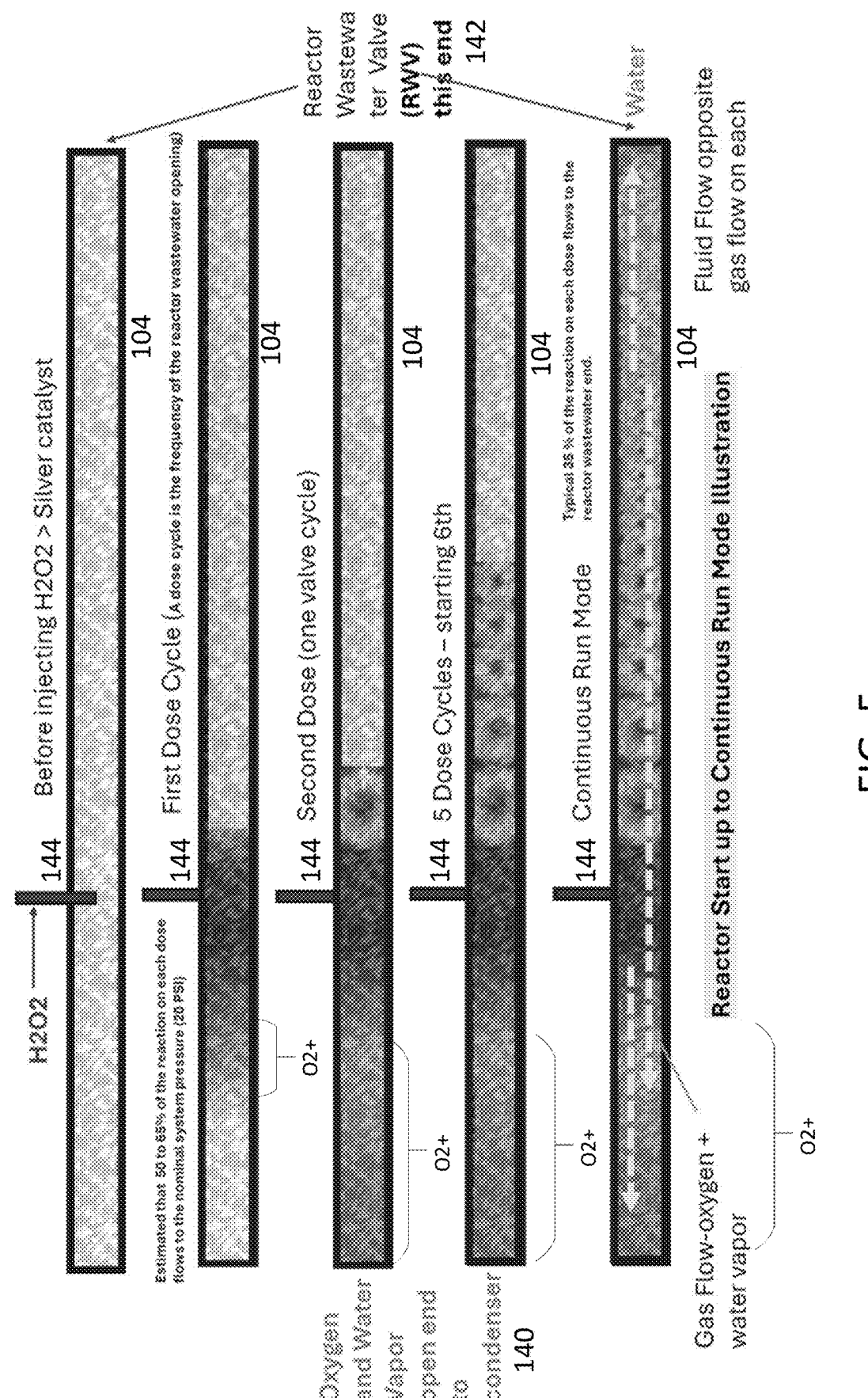
FIG. 5 includes five images, each of which is a schematic representation of an exemplary reactor (flattened for simplified illustration) at various stages (i.e., points of time) during a reactor start-up procedure.

FIG. 5 includes a series of images, each of which shows a schematic representation of an exemplary reactor 104 (straightened out for simplified illustration) at various stages (i.e., points of time) during a reactor start-up procedure. Specifically, each image shows the reactor 140 before or after a particular dose cycle. For example, the first image shows the reactor 140 before any dose cycle, the second image shows the reactor 140 after a first dose cycle, the third image shows the reactor 140 after a second dose cycle, the fourth image shows the reactor 140 after a fifth dose cycle, and the fifth image shows the reactor 140 once it has reached continuous run mode. In a typical implementation, the system cycles through a sequence of time segments, like 440*a*, 442*a*, 444*a*, and 446*a*, in each respective dose cycle. The reactions inside the reactor 140 builds progressively from image to image until reaching continuous run mode in the fifth image. The first image in FIG. 5 shows the reactor 104 prior to injecting hydrogen peroxide. The reactor 104 at this point is filled, from end 140 to end 142, with a tightly packed catalyst in the form of thin silver flakes. In an exemplary implementation, the thin silver flakes are solid silver, which has relatively high thermal conductivity making silver an excellent conductor of heat. The tightly packed nature of the thin silver flakes leaves only very small interstices between and around the thin silver flakes, through which fluid (e.g., hydrogen peroxide under pressure that exceeds a minimum threshold pressure) may flow. In a typical implementation, surface tension exists at the interface of the silver surfaces and any flowing fluids (e.g., the hydrogen peroxide). The tightly packed nature and irregular shapes of the silver flakes further ensures close contact, and sometimes multiple points of contact, between adjacent flakes of silver in the reactor 104. This close physical contact creates thermal pathways that are able to conduct heat from flake to adjacent flake along the length of the reactor 104. Silver is an effective catalyst to facilitate decomposition of hydrogen peroxide into water and oxygen. The reactor 104 has an internal passage that contains the silver flakes and that is long and narrow. The reactor 140 has an inlet 144 (for hydrogen peroxide) and two outlets-a first outlet 140 for oxygen and water vapor and a second outlet 142 for wastewater. The first outlet 140 in the illustrated implementation is closer to the inlet 144 than the second outlet 142, which is farther from the inlet 144.

The second image in FIG. 5 shows the reactor after a first dose cycle (e.g., after the first hydrogen peroxide delivery period 440*a*, the first idle period 442*a*, and the reactor water purging period 444*a*, e.g., during or at the end of the second idle period 446*a*). The silver catalyst flakes remain in place within the reactor 104 as the hydrogen peroxide moves into the elongated internal passage and catalyzes from contact with the silver flake catalyst. As noted, it is estimated that, in a typical implementation, approximately 50%-65% of the reaction (e.g., fluid reactant) on the first dose (and, in some implementations, on each of one or more subsequent doses) flows to the nominal pressure (20 psi). In a typical implementation, this flow is impeded by the tightly packed nature of the silver flakes inside the reactor 104. As shown, by the end of the first dose cycle, more of the fluid reactants and more of the reaction itseld will have migrated toward the first outlet 140 (for oxygen and water vapor) than toward the reactor wastewater outlet 142. It is believed that this is due, at least in part, to the reactor wastewater valve 112 at or downstream of the second outlet 142 being open only a short amount of time in a given dose cycle (e.g., the first dose cycle) and due to the tightly packed nature of the silver flakes inside the reactor 104 which tend to impede fluid flow through the reactor 140. The shading in the second image indicates that at least a small portion of the hydrogen peroxide (labeled as 02+) nearest to the first outlet 140 has, at the point represented in the second image of FIG. 5, substantially catalyzed into oxygen and water. At the point in time represented by the second image in FIG. 5, a comparatively small amount of hydrogen peroxide has migrated from the inlet 144 toward the second outlet 142. In a typical implementation, exothermic heat from the reaction rapidly heats the catalyst and the spread of heat is aided by the relatively high thermal conductivity of the silver flakes. Additionally, in some implementations, thermal insulation may be provided around the outside of the reactor 104 (or tubing that contains the silver catalyst) to conserve heat and to help keep the catalyst and the reactor at or above the boiling point of water at whatever pressure the reactor is at. The boiling point of water at about 20 psi, for example, would be about 110 C. In some instances, the thermal insulation may be applied to the entire reactor 104. In some instances, the thermal insulation may be applied to only to a portion of the reactor 104 (e.g., the portion that extends between the inlet 144 and the second outlet 142).

The third image in FIG. 5 shows the reactor after a second dose cycle (e.g., after a second hydrogen peroxide delivery period 440*b*, a subsequent first idle period, another reactor water purging period and at least the start of a second idle period). Again, the silver catalysts remains in place within the reactor 104 and the hydrogen peroxide continues to move through and catalyze from contact with the silver catalyst. As indicated, the oxygen (as represented by the O2+notation) has reached the first outlet 140 and oxygen (likely accompanied by water vapor) is exiting the reactor 104 at the first outlet end of the reactor 104. Moreover, at this point, a larger amount of oxygen (again, represented by the label O2+) exists between the inlet 144 and the first outlet 140, than in the second image of FIG. 5. The content of hydrogen peroxide located between the inlet 144 and the beginning of the O2+segment is at various stages of catalyzing. On the second outlet 142 end of the reactor 104, the fluid reactants have migrated even further from the inlet 144 and at least some of the hydrogen peroxide in that segment of the reactor 104 has catalyzed or at least started catalyzing into oxygen and water. More specifically, on the second outlet 142 side of the inlet 144, the fluid reactants (and resulting reactions), including some of those from the first dose cycle, have advanced a small amount towards the second outlet 142 of the reactor 104 and the fluid reactants (and resulting reaction) from the second dose cycle have mostly displaced the first dose taking up a position between the inlet 144 and the second outlet 142 closest to the inlet 144. In an exemplary implementation, the fluid reactants (and resulting reaction) that include at least some of the first dose occupy a portion of the reactor 104 labeled D1, and the fluid reactants (and resulting reaction) that include at least some of the second dose occupy a portion of the reactor 104 labeled D2. As mentioned herein, the movement of the fluid reactants (and resulting reaction) through the reactor 104 is impeded by the tightly packed silver flakes. Additionally, at the point in time represented in the third image in FIG. 5, some water may have started forming from the catalyzing of hydrogen peroxide and collecting on the second outlet 142 side of the inlet 144 in the illustrated reactor 104.

The fourth image in FIG. 5 shows the reactor after a five dose cycles (and starting a sixth). Again, the silver catalysts remains in place within the reactor 104 and the hydrogen peroxide continues to move through and catalyze from contact with the silver catalyst. The distribution and location of the fluid reactants on the first outlet 140 side of the reactor inlet 144 are substantially unchanged relative to the third image in FIG. 5. However, the fluid reactions (and resulting reactions) on the second outlet 142 side of the reactor inlet 144 have continued to advance toward the second outlet 142. In fact, in the illustrated image, the fluid reactants (and resulting reactions) on that side of the inlet 144 have advanced almost halfway to the second outlet 142. More specifically, on the second outlet 142 side of the inlet 144, some of the fluid reactants (and resulting reactions), most likely including some of those from the first dose cycle, have advanced to the very end of the space occupied by the fluid reactants (and resulting reactions). This space in the reactor 104 in the fourth image of FIG. 5 is labeled D1. The space just next to the D1 space, which may contain fluid reactants from the second dose (and/or resulting reactions) is labeled D2. The fluid reactants from these earlier doses have been displaced and moved toward the wastewater outlet 142 end of the reactor by later doses (e.g., a third dose, a fourth dose, and fifth dose, and a sixth dose). Meanwhile, the space immediately adjacent to (and in direct fluid contact) with the inlet 144 includes fluid reactants (and resulting reactions) from the sixth dose. This portion of the reactor is labeled D6. Each time the purge valve 112 opens, the fluid reactants, and the reactions themselves, are drawn through the silver flakes towards the wastewater outlet 142 end of the reactor 104. As mentioned herein, the movement of the fluid reactants (and resulting reaction) through the reactor 104 in this regard is impeded by the tightly packed silver flakes. At least some of the hydrogen peroxide throughout the reactor 104 has catalyzed or at least started catalyzing into oxygen/water vapor and water. Additionally, at the point in time represented in the fourth image in FIG. 5, water has continued collecting near the second outlet 142 end of the fluid reactants in the illustrated reactor 104.

The fifth image in FIG. 5 shows the reactor after startup (e.g., in a continuous run mode). Again, the silver catalysts remains in place within the reactor 104. At this point, the hydrogen peroxide is catalyzing with the silver catalyst and yielding oxygen (typically with some water vapor) that can and does exit the reactor 104 at the first outlet 140 and water that can and does exit the reactor 104 at the second outlet 142. The fluid reactant (e.g., hydrogen peroxide) that enters the reactor 104 through the inlet 144 flows in opposite directions (some towards the first outlet 140 and some towards the second outlet 142). Along the way, the hydrogen peroxide catalyzes into oxygen, which escapes the reactor 104 through the first outlet 140, and water, which largely escapes the reactor 104 through the second outlet 142. In some instances, oxygen (and potentially some water vapor) released from the hydrogen peroxide near the second outlet 142 ends up flowing in an opposite direction-towards the first outlet 140—to be expelled from the reactor 104 through the first outlet 140. In an exemplary implementation, the reactor 104 may deliver a continuous flow of oxygen and water vapor from the first outlet 140 and a pulsed expulsion of wastewater (from pulsed operation of the reactor wastewater valve 112) from the second outlet 142. In an exemplary implementation, the reactor 104 may produce an oxygen flow rate of 3 liters per minute using a source that includes 49.5% hydrogen peroxide and generating approximately 300 watts (of heat energy) per minute. In such instances, the reactor surface temperature reaches or exceed 100 C. In some implementations, for example, the reactor surface temperature may be between 105 C and 110 C. As shown in the fifth image, the reactor accommodates a flow of oxygen and water vapor in a first direction from a first portion of the elongated internal passage proximate the wastewater discharge port 142 to the oxygen and water vapor discharge port 140, while simultaneously accommodating a flow of water in a second direction that is opposite the first direction, towards the water discharge port 142.

Once the reactor has reached continuous run mode, for example, the system periodically introduces a new dose of hydrogen peroxide into the reactor 104 through the inlet 144. Each new dose is introduced in a first concentration (e.g., 49.5% hydrogen peroxide). That dose of hydrogen peroxide contacts the silver flakes and decomposes, exothermically, into water and oxygen. Heat from the exothermic decomposition enters the highly thermally conductive silver flakes and travels from flake to adjacent flake from the relatively high temperature reaction site for the new dose (i.e., the place inside the reactor where the new dose of hydrogen peroxide is decomposing from direct physical contact with the silver flakes) to lower temperature areas along the stack of silver flakes. This traveling heat tends to raise the temperature of other sections of reactor that may contain earlier, more-diluted, and already partially decomposed doses of hydrogen peroxide, for example. In a typical implementation, the reaction sites in the reactor 104, during reactor operation, reach temperatures that exceed the boiling point of a water at the associated operating pressures.

Thus, in a typical implementation, each dose cycle, a new dose of hydrogen peroxide is introduced into the reactor 104 to contact the catalyst (e.g., silver flakes) contained therein. The packed nature of the silver flakes inside the reactor 104 resists fluid flow through the reactor 104. In fact, in the absence of a minimum threshold differential pressure (e.g., 0.5 psi+/−5%) to establish fluid flow (e.g., between the inlet 144 and the first outlet 140 and/or between the inlet 144 and the second outlet 142), substantially all of the hydrogen peroxide (and any water or oxygen produced by the catalyzing of hydrogen peroxide) do not flow through the reactor 104. Thus, in the absence of a minimum threshold differential pressure, any hydrogen peroxide introduced into the reactor 104 will remain in the portion of the reactor 104 where it was introduced (e.g., immediately adjacent to the inlet 144). Likewise, in the absence of a minimum threshold differential pressure for fluid flow, any hydrogen or oxygen that results from the catalysis of the hydrogen peroxide will remain in (or immediately adjacent to) the portion of the reactor 104 where the hydrogen peroxide was introduced.

The catalyzing of the hydrogen peroxide increases the pressure and the temperature of any reaction sites (i.e., any sections in the reactor 104 where the hydrogen peroxide has been catalyzing). Notably, the pressure at each reaction site increases relative to both the pressure in condenser 116 (15-20 psi), which is downstream of the first outlet 140, and the wastewater tank 106, which is downstream of the second outlet 142 and may be operating at about 0 psi (e.g., less than 1 or 2 psi). Eventually, the pressure differential between any reaction site in the reactor 104 and the first outlet 140 exceeds the minimum threshold pressure for fluid flow through the packed silver flakes, at which point, the reaction (including hydrogen peroxide and catalyzed oxygen and hydrogen) starts moving, with some degree of uniformity, towards the first outlet 140. Each time a new dose of hydrogen peroxide is introduced into the reactor 104, that new dose begins to catalyze and the associated reaction begins to move through the reactor 104 towards the first outlet 140. In a typical implementation, the speed with which any reaction moves through the reactor 104 towards the first outlet may increase as well. In an exemplary implementation, if the pressure of reaction sites inside the reactor 104 reach 30 psi (+/−10%), flow may occur (e.g., from any such reaction site toward the first outlet 140 connected the condenser 116, which may be operating at about 20 psi (e.g., 15 to 25 psi). At this point, the pressure differential in the elongated internal passage exceeds the minimum threshold differential pressure required for fluid flow through the silver flakes between the reaction site(s) and the first outlet 140.

The packed nature of the silver flakes inside the reactor 104 resists fluid flow through the reactor 104 from the inlet to the second outlet 142 as well. In addition to that, the reactor wastewater valve 112 cycling open and closed further influences the flow of fluids (e.g., hydrogen peroxide and any water or oxygen that are released from the catalysis of the hydrogen peroxide) between the inlet 144 and the second outlet 142. As discussed, in a typical implementation, the reactor wastewater valve 112 opens only a short amount of time in each dose cycle. When that happens, if there is a reaction occurring inside the reactor 104 that is sufficient to establish a pressure differential between the reaction site and the second outlet 142 (which is connected to the wastewater tank, typically at about 0 psi) that is greater than the minimum required pressure differential for flow to occur, then, when the reactor wastewater valve 112 opens, the hydrogen peroxide and any other fluids (e.g., oxygen and water) resulting from the reaction at the reaction site advance, typically only a small amount each dose cycle, towards the second outlet 142. Thus, with each dose cycle, the hydrogen peroxide and any other fluids (e.g., oxygen and water) resulting from the reaction at the reaction site advance, in an incremental manner, towards the second outlet 142. In a typical implementation, the longer flow path and the slower, and the incremental movement of fluids involved in and resulting from the reaction towards through the second outlet 142 enable the hydrogen peroxide moving in that direction to spend more time in contact with the silver flakes.

As a fluid volume behavior example, in theory, 10 ml of H2O2 at the introduction point is reduced to slightly more than 3.5 ml (4.2 ml example, 120% of 3.5 ml) of H2O2 which on each reactor wastewater valve 112 opening, moves away from the introduction point. Eventually the full catalysis of that 4.2 ml becomes 3.5 ml of water as all oxygen has been released. In this example, it is more likely the final 3.5 ml volume is less as some water vapor has escaped to the reactor gas outlet. Typically, 1000 ml (one liter) of hydrogen peroxide at 50% is able to yield about 219 liters of oxygen at sea level. Therefore, in an exemplary implementation, 10 ml of 50% hydrogen peroxide is able to yield 2.19 liters of oxygen at near body temperature (37C). If the volume of the original first segment of hydrogen peroxide is 10 ml, then from this reaction, approximately 3.5 ml remains as a hydrogen peroxide solution and 65% of 2.19 liters of oxygen flows out with water vapor. The 3.5 liters of hydrogen peroxide continues catalysis and yields oxygen that flows more freely to the oxygen output side of the reactor 104, while the fluid remaining is retained by surface tension (e.g., from the tightly packed silver flakes). With each opening of the wastewater valve 112, the concentration of the hydrogen peroxide is reduced as the surface area of the silver catalyst reacts to release oxygen.

In some sense, in a typical implementation, pressure differentials are used to control aspects of the reactor 104. The direction of fluid flow within the reactor, for example, is determined first by pressure differentials and then by flow resistance of the catalyst. As an example, in some implementations, the 1st reaction of hydrogen peroxide and silver catalyst in the reactor may occur at 30 psi, and the reactor gas outlet may be at 20 psi, and the reactor wastewater valve 112 opens to 0 psi (atmospheric pressure) or near 0 psi. Thus, on each reactor wastewater valve 112 open cycle, the fluid portion of the hydrogen peroxide moves toward the reactor wastewater valve 112. Then this portion of the hydrogen peroxide stops moving and reacts with the silver catalyst. Since the catalyst is configured to have high resistance to fluid flow the fluid movement is limited. With each pulse cycle, the amount of fluid, which is diluted hydrogen peroxide, is a smaller volume. As the gas (water vapor+oxygen) have less resistance to flow than certain fluid (e.g., the hydrogen peroxide), the gas moves more freely toward the lower pressure reactor gas outlet. This gas flow verses fluid flow resistance is further enhanced as in the portion of the reactor proximal to the reactor wastewater valve 112 there is only water that is non-compressible unlike gas.

Figure 6:
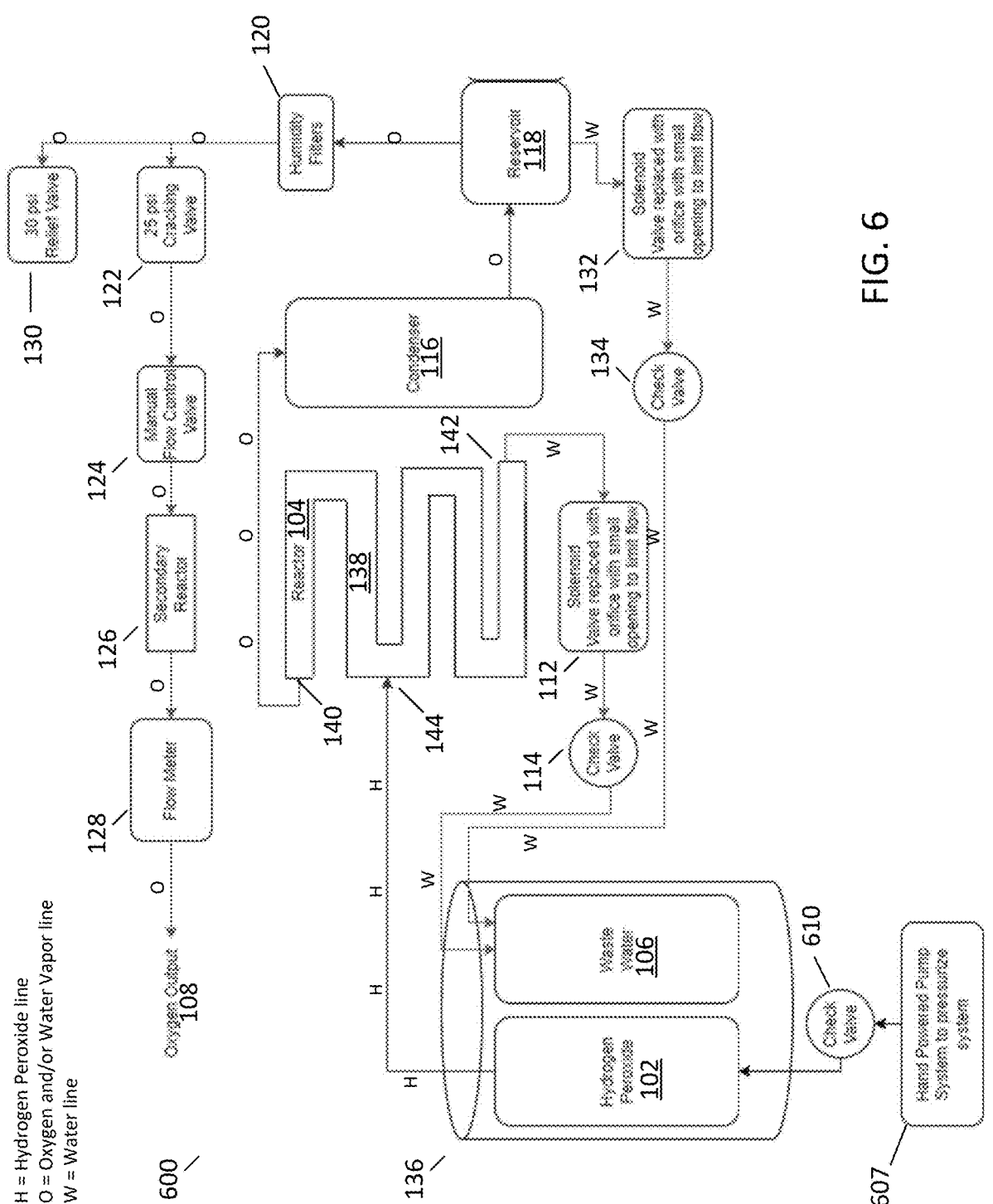
FIG. 6 is a partial schematic representation of an alternative exemplary system for producing oxygen.

In a typical implementation, the exothermic reaction raises the nominal temperature of reactor to at or above the boiling point of water (example>100C at sea level (e.g,. 101C, 102C or 103C), 119C at 20 PSI, and 125C at 30 PSI), while the boiling point of 50% hydrogen peroxide is higher at 114C at sea level. In fact, in a typical implementation, the temperature of the reaction in the reactor 104 is over 100C. Moreover, in a typical implementation, the temperature of the reaction in the reactor 104 is at the boiling point of water under system pressure, if not slightly greater (e.g., 1, 2, or 3C at least). As water vapor can condense with a pressure drop, condensation of the water vapor starts as the pressure drops from 30 PSI to the nominal system pressure shown at 20 PSI. At room temperature (e.g., 25C), it is observed that the combined wastewater has a temperature of less than 40C, which is desirable, for example, to avoid scalding when a user disposes of wastewater. FIG. 6 is a schematic representation of an alternative exemplary system 600 that is very similar to system 100 in FIG. 1. The main differences between system 600 and system 100 is that system 600 lacks pump 107, and check valves 110 and 111 and instead includes a hand powered pump 607 to pressurize the system 600, a check valve 610 between the hand powered pump 607 and the hydrogen peroxide tank 102, and fluid communication lines connecting these components as shown. FIG. 6 also does not show a power source or controller or associated electrically conductive lines.

In an exemplary implementation, system 600 may be operated as a non-electrically-powered system, run instead, for example, by human power (e.g., hand operated) only. In the illustrated system 600, the hand powered pump 607 is configured to pressurize the H2O2 source 102 through the check valve 610. Then, the system 600 may be operated by manually adjusting valves throughout the system 600 to regulate flow. Condensation may take place by using a condenser (heat exchanger, radiator) that does not require a fan, at least under certain atmospheric conditions. This configuration may be attractive in military or other remote location emergency oxygen applications. In the military application, the hand power can be used to pump hydrogen peroxide while the valves and other components may be operated off very low power batteries such as AA or a USB power source.

Figure 7:
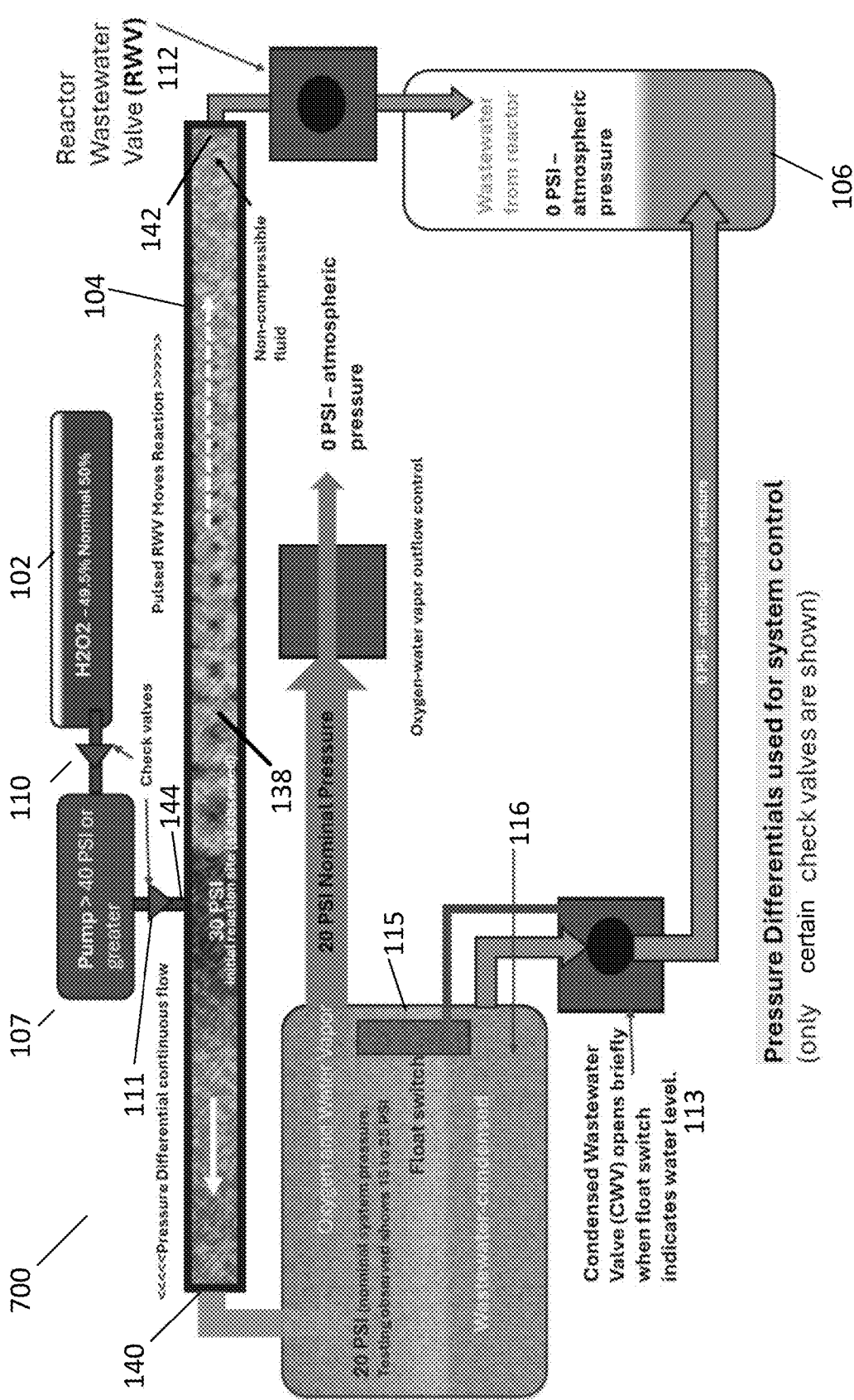
FIG. 7 is a partial schematic representation of yet another alternative exemplary system for producing oxygen.

FIG. 7 is a partial schematic representation of an exemplary system 700 for producing oxygen. The illustrated system 700 is similar to the system 100 in FIG. 1 and is shown, operationally, early on in the operational process. For example, like system 100, system 700 includes a hydrogen peroxide tank 102 (with 49.5%, nominally 50% H2O2), a pump 107 for pumping hydrogen peroxide from the hydrogen peroxide tank 102 to a reactor 104 (with an elongated internal passage 138 that is tightly packed with a catalyst, e.g., silver flakes), a first check valve 110 between the hydrogen peroxide tank 102 and the pump 107, a second check valve 111 between the pump 107 and the reactor 104, and fluid communication lines connecting these components to one another as shown. The reactor 104 has a first outlet (at 140) for oxygen and water vapor at a first end of the elongated internal passage 138 and a second outlet (at 142) for wastewater at a second end of the elongated internal passage 138. The inlet 144 to the reactor 104 is between the first outlet and the second outlet 142, closer to the first outlet 140. The portion of the elongated internal passage 138. There is a condenser 116 connected to the first outlet 116 and a wastewater tank 106 connected (via a reactor wastewater valve 112) to the second outlet 142 of the reactor 104. The condenser 116 expels oxygen and water vapor in a controlled manner (e.g., through a cracking valve such as 122) to atmosphere. The condenser 116 expels wastewater, condenser wastewater valve 113 to the wastewater tank 106.

Pressure differentials in the illustrated system 700 are utilized for system control. Specifically, the pump 107, in the illustrated implementation, is configured to produce a pressure of at least 40 psi. The initial reaction site (i.e., just inside the reactor 104 where the inlet 144 introduces the hydrogen peroxide to the silver catalyst) experiences a reaction pressure of 30 psi according to the illustrated implementation. The reaction fluids that are involved in the reaction that takes place at the initial reaction site and elsewhere throughout the elongated internal passage 138 in the reactor move throughout the elongated internal passage 138 under the influence of pressure differentials in the system 700.

From that initial reaction site, fluid flows in opposite directions initially within the elongated internal passage 138, through the interstices between and around the silver flakes, with oxygen and water vapor ultimately exiting the reactor 104 at the first end 140 thereof and with water ultimately exiting the reactor 104 at the second end 142 of thereof. As indicated in the figure, the pressure inside the condenser 116 is nominally 20 psi and testing has confirmed that, in an exemplary implementation, the pressure inside the condenser 116 may be between 15 psi and 25 psi. The entirety of the pressure range (15 psi to 25 psi) is less than the noted 30 psi that occurs at the initial reaction site. This pressure differential facilitates the flow of fluid between the initial reaction site to the condenser 116. As noted in the figure, in some instances, this flow may be a continuous flow.

The water vapor condenses in the condenser 116 to yield wastewater and oxygen (typically with a lesser amount of water vapor) at its outlets. The oxygen and water vapor, as noted in the figure, exit at a nominal pressure of 20 psi (with outflow control provided, for example, by one or more flow control devices, such as shown in the system 100 of FIG. 1. The oxygen and water vapor, as noted in the figure, exit the system 700 at atmospheric pressure (e.g., 0 psi). The pressure differential between the condenser 116 and atmosphere facilitates fluid flow in the indicated direction and manner. The wastewater, as noted in the figure, exits the condenser 116 and passes through a condensed wastewater valve (CWV 113), which is controlled or actuated, before reaching the wastewater tank 106, which, again, is at atmospheric pressure. The CWV 113 in the illustrated example is controlled by (e.g., opens and closes in response to) a float 115 in the condenser 116 that is configured to detect changes of elevation in the liquid free surface inside the condenser 116. In a typical implementation, as the float rises, the CWV 113 opens, allowing the expulsion of wastewater to the wastewater tank 106, and as the float falls, the CWV 113 closes, sealing off the fluid flow path from the condenser 116 to the wastewater tank 106. When the CWV 113 opens, the pressure differential between the condenser (nominally 20 psi) and the wastewater tank 106 facilitates fluid flow in the indicated direction and manner. In some implementations, the wastewater reservoir inside the condenser 116 contains a means to impede the flow of water through and out of the condenser 116. The means to impede can be any one of a variety of different physical structures that are able to impede or restrict fluid flow. Some examples include open cell foam, a sintered metal filter material, silver flakes (as in the reactor 104), or a permeable filter through which oxygen and some water vapor will flow easily but through which liquid water will not easily flow. In some instances, the means to impede may facilitate making the system 700 portable. The wastewater formed in the reactor 104 exits the reactor 104 and flows through the reactor wastewater valve 112 to the wastewater tank 106. The pressure differential between the internal elongated passage 138 of the reactor 104 and the wastewater tank 106 facilitates fluid flow in the indicated direction and manner so that, when the reactor wastewater valve 112 is open, the wastewater from the reactor 104 (a non-compressible fluid) exits the reactor 104 and flows, through the reactor wastewater valve 112, to the wastewater tank 106. In a typical implementation, the reactor wastewater valve 112 may be operated in a pulsed manner.

Figure 8:
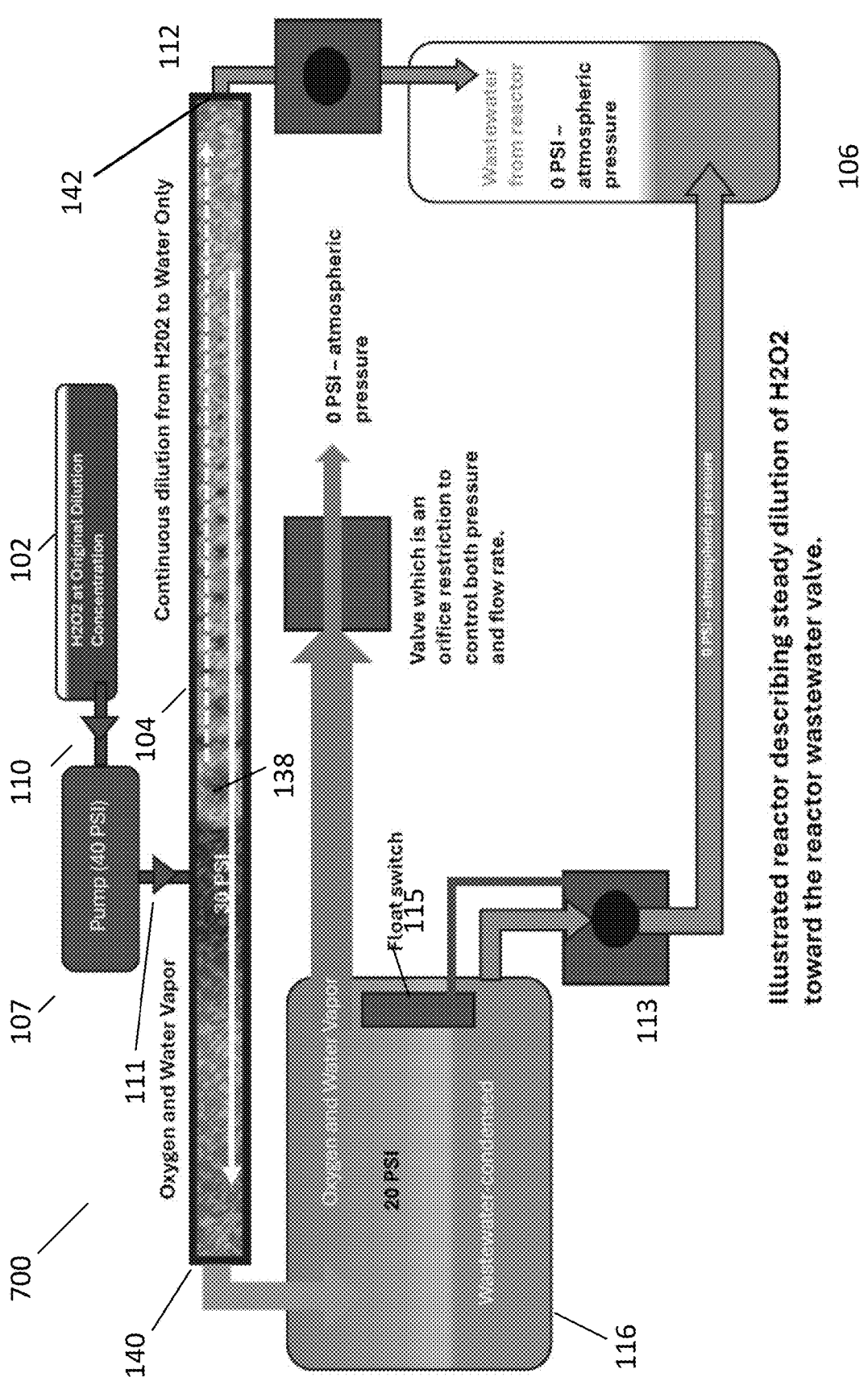
FIG. 8 is a partial schematic representation of the exemplary system of FIG. 7 in a steady state operating state.

FIG. 8 shows the system 700 of FIG. 7 in a steady state operating state. The illustrated figure shows that the distribution of the fluid reactant varies throughout the elongated internal passage 138 of the reactor 104. Specifically, the fluids transition, substantially smoothly from H2O2 at the original dilution concentration at the injection site (e.g., the initial reaction site in the elongated internal passage 138 near the H2O2 inlet) to oxygen and water vapor at the first outlet 140 of the reactor 104. Moreover, the distribution of fluids from the injection site to the second outlet 142 varies continuously from H2O2 at the original dilution concentration at the inlet to water only at the second outlet 142.

The illustrated figure also notes that the oxygen-water vapor outflow control from the condenser 116 may, in some implementations, either be or include an orifice restriction to control both pressure and flow rate.

A number of embodiments of the invention have been described. Nevertheless, it will be understood that various modifications may be made without departing from the spirit and scope of the invention.

For example, silver flakes are described herein as being an appropriate catalyst to catalyze the hydrogen peroxide into water and oxygen. The silver may be high purity silver. In a typical implementation, the silver may be near pure silver flakes, typically, small, thin (irregularly contoured) particles of silver that have a very high, but not necessarily 100% pure; typically, around 99% to 99.999% pure. An advantage of high purity silver is that it is readily available, there is an insignificant amount of other elements, and silver is non-toxic to humans. Additionally, the specific physical configuration of the flakes can vary. In general, the configuration may be aimed at optimizing for high surface area and low mass. This tends to create, in some embodiments, high surface tension which resists the free flow of liquids in addition to high reactive surface area. Moreover, silver typically does not break down and fracture during catalysis. In a typical implementation, the systems and methods disclosed herein may provide continuous humidified oxygen flow at regulated flow rates. In a typical implementation, the fluid surrounding the reaction is substantial and absorbs much of the heat produced and thus the silver catalyst does not likely approach a melting point. In some implementations, the hydrogen peroxide (e.g., if above 34%) may have added stabilizer. Testing suggests that stabilizers may have an initial small effect on the rate of catalysis and then may not change. Further, it has been observed that the configuration and design of the catalyst chamber seems to self-clean and stabilizers accumulate in wastewater. The column of catalyst that controls flow through pressure differential likely aids in this process.

It is believed that a reaction of silver and 50% or less (maybe 63% or less) hydrogen peroxide has three phases which are: 1) HEATING—a slow start of the reaction at room temperature until the H2O2 and silver react sufficiently to increase the fluid temperature sufficient to speed the reaction. The reaction may increase rapidly (e.g., from 40C to 70-80C) and then become more rapid from 90C to 100C or more. 2) MAJOR REACTION—a violent rapid reaction starts in which as much as 80% of the reaction occurs in less than 1 minute and then, 3) LOW CONCEN-TERATION H2O2 REACTION—This is a slower reaction that completes the reaction with low concentration of H2O2 and can take longer than 10 minutes. These phases can vary (e.g., in timing/duration). In a typical implementation, the later part of the reaction inherently slows down as the wastewater dilutes the reaction and absorbs the exothermic heat.

In a typical implementation, the reaction may be controlled using pressure differentials. There is a nominal pressure of the system (e.g., 15 PSI) and a high local peak pressure spike in the reactor. This pressure is first determined by the outflow of oxygen from the system and dosing of hydrogen peroxide. A control may be provided in the form of a valve located, for example at the base of the reactor, which opens to a much lower pressure (typically atmosphere). This valve allows: 1) the reactor to introduce a batch of hydrogen peroxide and as it starts to react, pull the hydrogen peroxide down and expose it to more silver. If this pull-down process was not enabled, the reaction may boil out the top of the reactor with some unreacted hydrogen peroxide, 2) the valve to close and allow the lower batch now at a lower concentration of H2O2 to react and then 3) after a waiting period a new dose drops on silver catalyst that is substantially free of wastewater and thus not inhibiting by dilution the next reaction. 4) below the first reaction chambers and catalyst sections may be more reaction chambers with the last section of silver catalyst flaks more tightly stacked. At the bottom of the reaction chamber is a wastewater collection chamber. The drain valve may be configured to open to this chamber. In simple terms, 60 to 80% of the water produced may leave the reactor as water vapor with oxygen. The remaining hydrogen peroxide solution at a lower concentration and diluted by water travels downward and oxygen gas bubbles upward through spaces between the catalyst flakes. When the drain valve opens, all fluid in the silver catalyst stack moves incrementally downward. When the drain valve closes, the unreacted hydrogen peroxide dwells and reacts until another low pressure cycle pulls it down. Thus, no prior batch of hydrogen peroxide is diluted by a new batch. These details can vary.

The reaction may be managed in a number of ways. In an exemplary implementation, however, the system manages the reaction so that enough time lapses to fully catalyze the H2O2 into water and oxygen such that, in some implementations, all water produced is safe for human and environmental exposure and all oxygen has no, or virtually no, hydrogen peroxide gas content (e.g., far below 1 ppm, typically in the parts per billion range and no more that might be naturally occurring in the atmosphere or within the human body).

The system may have a variety of means to introduce H2O2 into the reactor. In a typical implementation, controlled dosing is desired. Thus, the means for introducing the H2O2 may be a pump configured to deliver metered doses.

The pump may be, for example, a gear pump with a stepper motor controller (that may be part of or controlled by, e.g., system controller) which may allow for doses of 2 ml and greater at 1 ml increments. The pump may push the H2O2 through a check valve and then into the reaction chamber. The pump must push against the variable pressure created by the reaction and this can be from zero to well above 30 PSI. A stainless steel gear pump may be desirable in certain circumstances because it is low power, the dose is relatively consistent, the pump usually can overcome any back pressure up to 180 PSI and there is near zero friction or any flexing parts as in a diaphragm pump which will not have the long life of a gear pump. Other pumps can be used but a gear pump has proven easy to control, low power consumption, and high pressure. It is worth noting that, in some implementations, a single gear pump may be connected to one or more manifolds, each with multiple valves, to pump from one or more sources to one or more destinations for the hydrogen peroxide, selectively. A diaphragm pump in combination with check valves may be used to substantially provide the same functions as a gear pump.

The timing of doses may be controlled in a variety of ways. In a typical implementation, however, to produce a continuous flow of oxygen and manage the wastewater the dosing system must be controlled. One algorithm is 1>Dose, 2>wait, 3>open the drain valve to atmospheric pressure then close and 4>wait time until the next dose. An example of this may be dose 4 ml, wait 2 seconds, open the drain valve for 3 seconds, and then wait for 10 seconds for the next dose. In an exemplary implementation, this may dose 16 ml in one minute. It may take approximately 4.6 milliliters of 50% hydrogen peroxide to produce on liter of oxygen. So 16 ml may produce about 3.5 liters a minute of oxygen. Dose algorithms for startup, shut down, and various flow rates may vary.

In an exemplary implementation, a desired reaction rate may require heating the silver and hydrogen peroxide (e.g., to well above 25C (room temperature)). This can be accomplished in a variety of possible ways including, for example: 1) adding small amounts of hydrogen peroxide and allowing this to react and start producing enough heat to speed the reaction (feasible but tends to be slow), 2) heating the hydrogen peroxide before introduction to the catalyst (e.g., by heating the tube carrying the H2O2 or heating the H2O2 itself), 3) providing a heating element to contact the silver catalyst and heat the silver catalyst and any residual water. This 3rd option may be preferred in some instances and due to silver's relatively high thermal conductivity a generally good method. A heater also has the benefit of potentially unfreezing residual water that may be present in the catalyst. If a cartridge had both a reservoir for hydrogen peroxide and wastewater, then as the system runs, the wastewater would heat the hydrogen peroxide to near 40C.

The reactor configuration can vary. In some instances, the reactor is or includes a tube manufactured from stainless steel. In some instances, an aluminum tube which is sealed at the bottom and has a drain valve connection is used. The top of the tube has hole through which oxygen and water vapor flow. The size of this hole can be used to increase the peak pressure inside the reactor by reducing the size or decrease the pressure by enlarging the hole.

In various implementations, it may be desirable to insulate the reactor to retain heat. This may be accomplished by surrounding the reactor with thermal insulation. In some implementations, the condenser may be configured to surround the reactor (or some portion of the reactor) to help retain heat. In that sort of configuration, heat from the condenser may be channeled to the reactor to conserve heat.

Variations are, of course, possible. However, in an exemplary implementation, the catalyst is packed very dense and only about 13% is open and not silver. As each flake is an average of 0.005" thick, then in 0.4", only 0.052 inches is open and if we divide that by 70 (0.4"/.005=80) and each gap averages around 0.0007". The average thickness is 0.005" and the tubing is 87% full of the flakes, leaving about 13% open for gas and fluid passage. In a 24" of reactor tube 0.6" diameter, with a volume of 6.78 cubic inches, only 0.87 cubic inches is available for fluid and gas. 14.26 ml=87 cubic inches. So, if 14 ml is dosed per minute, about 55-65% leaves as gas and 35 to 45% goes toward the wastewater valve (9.34 ml) and the oxygen gradually leaves toward the gas outlet before becoming water.

In another exemplary implementation, the silver flake thickness is about 0.12 mm (e.g., in an example 5 samples were measured ranging from 0.11 mm to 0.12 mm). In such an implementation, the silver density was 10.49 g/cm$^3$. There was 2.5 grams of silver per 0.4 inches for 10 inches. The tube dimensions in this example were 0.625" outer diameter, with a wall thickness of 0.02" and an inner diameter of 0.585". The volume of silver in 0.4 inches was 0.238 cm$^3$ and the volume of the tube in 0.4 inches was 0.273 cm$^3$. The percentage of the tube populated by silver was 87.27%.

In some implementations, one or more of the components described herein as being integrated into one overall assembly, may be physically separate from each other (and not physically integrated). In general, any system component(s) provided on a separate base would be operationally connected into the system (and to the other system components) as shown in the drawings and otherwise described herein to the other system components. In some implementations, more than one of the system components may be provided as a physically discrete component (and not mounted on the same base as the other system components).

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, unless explicitly stated, this should not be understood as requiring that such operations be performed in the particular order shown or in sequential order, or that all represented operations be performed, to achieve desirable results.

Other implementations are within the scope of the claims.

What is claimed is:

1. A method of generating oxygen, the method comprising:

introducing a solution comprising hydrogen peroxide into a reactor that comprises:

an elongated internal passage;

an oxygen outlet at a first end of the elongated internal passage;

a water outlet at a second end of the elongated internal passage; and an inlet for the introduction of the solution comprising hydrogen peroxide in a middle portion of the elongated internal passage, wherein the middle portion of the elongated internal passage is between the first end and the second end; and silver flakes packed tightly within and substantially filling the elongated internal passage from the first end to the second end, wherein the silver flakes form interstices between and around the silver flakes to accommodate fluid flow through the elongated internal passage, wherein the interstices are configured to accommodate fluid flow through the elongated internal passage in a substantially restricted manner such that substantial fluid flow only occurs under influence of a pressure differential in the elongated internal passage that exceeds a predetermined threshold value associated with the fluid;

catalyzing a decomposition reaction of the hydrogen peroxide into water and oxygen with the silver flakes inside the elongated internal passage;

causing the hydrogen peroxide and the decomposition reaction to move in a stepwise, periodic manner through the interstices in the elongated internal passage from the inlet toward the water outlet by periodically opening a first valve connected to the water outlet; and enabling the oxygen and a water vapor produced by the decomposition reaction to flow through the interstices toward the oxygen outlet, wherein the solution comprising hydrogen peroxide comprises at least 39.5% hydrogen peroxide.

2. The method of claim 1, wherein introducing the solution comprising the hydrogen peroxide comprises:

(a) introducing a dose of the solution comprising the hydrogen peroxide via the inlet port to the reactor during a first time segment;

(b) ceasing the introduction of the dose of the solution comprising the hydrogen peroxide into the reactor during a second time segment after the first time segment;

(c) opening the first valve connected to the water outlet during a third time segment after the second time segment thereby causing the hydrogen peroxide and the decomposition reaction to move from a first location in the elongated internal passage to a second location in the elongated internal passage, wherein the second location in the elongated internal passage is closer than the first location in the elongated internal passage to the water outlet; and (d) closing the first valve connected to the water outlet during a fourth time segment after the third time segment so that the movement of the hydrogen peroxide and the decomposition reaction toward the water outlet ceases.

3. The method of claim 2, wherein introducing the solution comprising the hydrogen peroxide further comprises:

repeating steps (a) through (d).

4. The method of claim 3, further comprising:

enabling the oxygen and water vapor produced by the decomposition reaction to exit the reactor via the oxygen outlet and to enter a condenser that is configured to condense water out of the oxygen and water vapor, wherein the condenser operates at a pressure between 15 psi and 25 psi.

5. The method of claim 4, further comprising:

collecting the water that condenses out of the water vapor in a reservoir; and controlling a flow of water out of the reservoir to a wastewater tank at atmospheric pressure with a second valve connected to a drain on the reservoir.

6. The method of claim 4, further comprising delivering the oxygen to an oxygen outlet for delivery to a human patient.

7. The method of claim 2, further comprising:

preventing the flow of water out of the reactor during the first time segment by maintaining the first valve in a closed position during the first time segment; and preventing the flow of water out of the reactor during the second time segment by maintaining the first valve in the closed position during the second time segment.

8. The method of claim 2, further comprising:

preventing the introduction of hydrogen peroxide into the reactor during the second time segment, the third time segment, and the fourth time segment.

9. The method of claim 1, wherein the first time segment has a duration of 100 milliseconds to 700 milliseconds, the second time duration has a duration of 2 seconds to 5 seconds, the third time segment has a duration of 1 second to 2 seconds, and the fourth time segment has a duration of 2 seconds to 5 seconds.

10. The method of claim 1, wherein the hydrogen peroxide is introduced into the reactor by virtue of a pump that is connected via a first check valve to a source of the hydrogen peroxide, and that is connected via a second check valve to the inlet port of the reactor.

11. The method of claim 1, wherein each one of the silver flakes is less than 0.005 inches in thickness, and wherein the elongated internal passage has a diameter that is between 0.3 inches and 1 inch, and a length between 24 inches and 30 inches, and a volume occupied by the silver flakes inside the elongated internal passage is between 70% and 90% of a cavity in the elongated internal passage where the silver flakes are present.

12. The method of claim 11, further comprising:

causing 50% to 65% of fluid involved in the decomposition of hydrogen peroxide into water and oxygen for a dose of hydrogen peroxide introduced into the reactor to move from the inlet port towards the oxygen outlet.

13. The method of claim 1, further comprising:

delivering the water from the decomposition that flows out of the reactor through the first discharge port to a wastewater tank at atmospheric pressure.

14. The method of claim 1, wherein a fluid flow path inside the reactor between the inlet and the water outlet is longer than a fluid flow path inside the reactor between the inlet and the oxygen outlet.

15. The method of claim 1, wherein the silver flakes are made of solid 99%+purity silver.

16. A system for generating oxygen, the system comprising:

a source of hydrogen peroxide;

a hydrogen peroxide reactor coupled to the source of hydrogen peroxide, the hydrogen peroxide reactor comprising:

an elongated internal passage;

an oxygen outlet at a first end of the elongated internal passage;

a water outlet at a second end of the elongated internal passage; and an inlet for the introduction of the hydrogen peroxide in a middle portion of the elongated internal passage, wherein the middle portion of the elongated internal passage is between the first end and the second end; and silver flakes packed tightly within and substantially filling the elongated internal passage from the first end to the second end, wherein the silver flakes form interstices between and around the silver flakes to accommodate fluid flow through the elongated internal passage, wherein the interstices are configured to accommodate fluid flow through the elongated internal passage in a substantially restricted manner such that substantial fluid flow only occurs under influence of a pressure differential in the elongated internal passage that exceeds a predetermined threshold value associated with the fluid;

a pump configured to introduce hydrogen peroxide from the source of hydrogen peroxide to the inlet of the reactor; and a valve configured to control a flow of water through water outlet of the reactor, wherein the system is operational to:

introduce a solution comprising hydrogen peroxide into the reactor;

catalyze a decomposition reaction of the hydrogen peroxide into water and oxygen with the silver flakes inside the elongated internal passage;

cause the hydrogen peroxide and the decomposition reaction to move in a stepwise, periodic manner through the interstices in the elongated internal passage from the inlet toward the water outlet by periodically opening a first valve connected to the water outlet; and enable the oxygen and a water vapor produced by the decomposition reaction to flow through the interstices toward the oxygen outlet, wherein the solution comprising hydrogen peroxide comprises at least 39.5% hydrogen peroxide.

17. The system of claim 16, wherein introducing the solution comprising the hydrogen peroxide comprises:

(a) introducing a dose of the solution comprising the hydrogen peroxide via the inlet port to the reactor during a first time segment;

(b) ceasing the introduction of the dose of the solution comprising the hydrogen peroxide into the reactor during a second time segment after the first time segment;

(c) opening the first valve connected to the water outlet during a third time segment after the second time segment thereby causing the hydrogen peroxide and the decomposition reaction to move from a first location in the elongated internal passage to a second location in the elongated internal passage, wherein the second location in the elongated internal passage is closer than the first location in the elongated internal passage to the water outlet; and (d) closing the first valve connected to the water outlet during a fourth time segment after the third time segment so that the movement of the hydrogen peroxide and the decomposition reaction toward the water outlet ceases.

18. The system of claim 17, wherein the system is further operational such that:

the first valve is closed and thereby prevents the flow of water out of the reactor while the hydrogen peroxide is being introduced into the reactor during the first time segment, the first valve remains closed to prevent the flow of water out of the reactor during the second time segment, the pump stops to prevent the introduction of hydrogen peroxide into the reactor during the second time segment, the third time segment, and the fourth time segment.

\* \* \* \* \*